(12) United States Patent
Whittington et al.

(10) Patent No.: US 10,133,695 B2
(45) Date of Patent: Nov. 20, 2018

(54) LINK SYSTEM FOR ESTABLISHING HIGH SPEED NETWORK COMMUNICATIONS AND FILE TRANSFER BETWEEN HOSTS USING I/O DEVICE LINKS

(71) Applicant: CROSSPORT NETWORK SOLUTIONS INC., Mississauga (CA)

(72) Inventors: Christopher Whittington, Brampton (CA); Renato Condotta, Caledon (CA)

(73) Assignee: CROSSPORT NETWORK SOLUTIONS INC., Mississauga (CA)

( * ) Notice: Subject to any disclaimer, the term of this patent is extended or adjusted under 35 U.S.C. 154(b) by 93 days.

(21) Appl. No.: 14/917,402

(22) PCT Filed: Dec. 8, 2014

(86) PCT No.: PCT/CA2014/051179
§ 371 (c)(1),
(2) Date: Mar. 8, 2016

(87) PCT Pub. No.: WO2015/081448
PCT Pub. Date: Jun. 11, 2015

(65) Prior Publication Data
US 2016/0217093 A1    Jul. 28, 2016

Related U.S. Application Data

(60) Provisional application No. 61/913,383, filed on Dec. 8, 2013.

(51) Int. Cl.
*G06F 13/20* (2006.01)
*G06F 13/00* (2006.01)
(Continued)

(52) U.S. Cl.
CPC ...... *G06F 13/4022* (2013.01); *G06F 13/4282* (2013.01); *H04L 12/40* (2013.01); *H04L 12/462* (2013.01); *G06F 13/385* (2013.01)

(58) Field of Classification Search
None
See application file for complete search history.

(56) References Cited

U.S. PATENT DOCUMENTS 6,851,009 B1    2/2005 Regula
7,039,750 B1    5/2006 Regula et al.
(Continued)

*Primary Examiner* — Michael Sun
(74) *Attorney, Agent, or Firm* — Heer Law; Christopher D. Heer

(57) ABSTRACT

A High Speed Link System providing network and data transfer capabilities, implemented via standard input/output (I/O) device controllers, protocols, cables and components, to connect one or more Host computing systems, comprising a System, Apparatus and Method is claimed; and described in one or more embodiments. An illustrative embodiment of the invention connects two or more Host systems via USB 3.0 ports and cables, establishing Network, Control, Data Exchange, and Power management required to route and transfer data at high speeds, as well as resource sharing. A Link System established using USB 3.0 operates at the full 4.8 Gbps, eliminating losses inherent when translating to, or encapsulating within, a network protocol, such as the Internet Protocol. Method claimed herein describes how two or more connected Host systems, detect one another, and establish separate communication and data exchange bridges, wherein control sequences from the Hosts' application direct the operation of the Apparatus.

20 Claims, 13 Drawing Sheets

(51) Int. Cl.
    *G06F 13/40*     (2006.01)
    *H04L 12/40*     (2006.01)
    *H04L 12/46*     (2006.01)
    *G06F 13/42*     (2006.01)
    *G06F 13/38*     (2006.01)

(56) References Cited

U.S. PATENT DOCUMENTS

| | | | | |
|---|---|---|---|---|
| 8,504,755 | B2* | 8/2013 | Beadnell | G06F 13/36 |
| | | | | 710/313 |
| 8,543,890 | B2* | 9/2013 | Dodson | G06F 13/4022 |
| | | | | 714/758 |
| 8,554,976 | B2 | 10/2013 | Buxton et al. | |
| 8,880,771 | B2 | 11/2014 | Subramaniyan et al. | |
| 9,047,257 | B2 | 6/2015 | Aravindhan | |
| 2004/0025052 | A1* | 2/2004 | Dickenson | G06F 21/78 |
| | | | | 726/4 |
| 2004/0049624 | A1* | 3/2004 | Salmonsen | G06F 13/40 |
| | | | | 710/306 |
| 2004/0179534 | A1* | 9/2004 | Pettey | H04L 67/24 |
| | | | | 370/395.5 |
| 2006/0240831 | A1* | 10/2006 | Toskala | H04W 36/0055 |
| | | | | 455/436 |
| 2009/0138638 | A1* | 5/2009 | Russo | G06F 13/4291 |
| | | | | 710/106 |
| 2009/0154456 | A1 | 6/2009 | Dodson et al. | |
| 2013/0013823 | A1* | 1/2013 | Altmayer | G06F 13/385 |
| | | | | 710/33 |
| 2013/0024595 | A1 | 1/2013 | Subramaniyan et al. | |
| 2014/0201636 | A1* | 7/2014 | Freitas | H04N 5/44543 |
| | | | | 715/719 |
| 2014/0304695 | A1* | 10/2014 | Gambardella | H04L 65/80 |
| | | | | 717/168 |
| 2015/0019789 | A1 | 1/2015 | Subramaniyan et al. | |

\* cited by examiner

LINK SYSTEM FOR ESTABLISHING HIGH SPEED NETWORK COMMUNICATIONS AND FILE TRANSFER BETWEEN HOSTS USING I/O DEVICE LINKS

FIELD OF THE INVENTION

The present application relates generally to the establishment of a network for communications and high speed file transfers between one or more Host systems using bridged connections of standard high speed peripheral devices and cables; and having a preferred implementation that leverages Universal Serial Bus (USB) peripheral cables and device components, to establish USB Host to Host and Host to multi-Host networking and high speed file transfers.

BACKGROUND OF THE INVENTION

Peripheral communications protocols provide the ability to connect additional electronic devices directly to the CPU of a Host system. Most modern peripheral communications protocols provide ultra-high speed connections to ensure the transfer of data to meet the requirements of modern CPUs. Popular peripheral protocols include the Universal Serial Bus (USB) and the Peripheral Component Interconnect (PCI) among others. USB is a globally accepted and widely used plug-and-play interface for peripheral devices such as digital cameras, scanners, printers, Compact Disc (CD) players, Digital Versatile Disc (DVD) players, as well as modern game consoles, etc. USB connections continue to evolve, providing improvements in high speed data transfer with power delivery. Two recently released versions of the USB Specification introduced multiple advantages over previous versions and other protocols, including full duplex communications. USB version 3.0 (hereinafter "USB 3") delivers high speed data rates of 5 Gbps (Gigabits per second) and USB version 3.1 (hereinafter "USB 3.1") delivers 10 Gbps.

Peer to peer connections between Hosts using USB version 2.0 (hereinafter "USB 2.0" or "USB 2") employ a fixed Host to Host cable with embedded specialized electronic components and dependent on various protocol conversions. The USB 2.0 Host to Host cable is, in reality, a virtual Ethernet cross-over cable or bridge device deployed using the USB interface solely as the medium for interconnection to the Host computers. As such, these cables require proprietary drivers and paired application software running at both ends of the connection; thus creating substantial throughput limitations as Internet Protocol (IP) packet processing and conversions are required at each Host to support the connection. As a result, despite an available 40 MBps throughput provided by the USB 2.0 port interface, actual data transfer speeds drop to only 12 MBps. Linking additional Hosts via Ethernet connections, while possible, is not viable—each additional host significantly increases overhead requirements and overall performance suffers significantly.

A direct USB 3.0 Host to Host connection has similarly been released into the market, employing the familiar method of using Ethernet cross-over cable to carry encapsulated USB 3.0 packets. Effective speed of the USB 3.0-to-Ethernet Host to Host cable using this method is reported to be approximately 40 MBps; a significant reduction from the available 480 MBps provided by the USB 3 specification. New USB 3 specifications define the use of a direct link USB 3 Male-A to Male-A Crossover cable, which does not include the Vbus or Bus Power contingent, designed primarily for connecting two Hosts for the purposes of diagnosis and other restricted uses.

BRIEF SUMMARY OF THE INVENTION

The present application discloses a method and apparatus for establishing a Link System providing network communications and high speed data transfer capabilities between two or more coupled Host computers (hereinafter "Host" or "Host system" or USB Host system") employing at least two standard peripheral connections, in bridged configuration, creating a dedicated communication link and a dedicated data link which, in combination, form a private network to independently exchange control and high speed data between the coupled Host systems. Implementations employing the USB 3.0 SuperSpeed protocol, provide for network and file transfer speeds of 5 Gbps; similarly the use of USB 3.1 Enhanced SuperSpeed protocol and components can achieve speeds of 10 Gbps.

In using the apparatus, methods and system proposed herein, the Host systems, upon connection, may detect one another and establish a network link consisting of several bridged paths for network, control, high speed data transfer, and power may be established. The Host systems may employ one or more protocols providing detection, negotiation, link, service, flow direction, high speed data transfer management, and power management.

In a preferred embodiment, a proposed system comprises a centrally located Link System with a standard USB 3 Type-A Male connector at each end of a link cable extending from the Link System. The Link System may be seen to serve as to couple the USB 3 Host ports by interconnecting or bridging the various opposing communications and high speed data exchange paths in a network environment in which control sequences from the Host application interact with both the Link System and opposite Host system. The Hosts, coupled through the intermediary Link System, negotiate and facilitate the selection of data paths and data directional flow; interface elements and provisions to accommodate Data and File transportation are provided by native Host Operating System functionality.

According to an aspect of the present disclosure, there is provided a method for transferring data over links established between a first universal serial bus Host and a second universal serial bus Host, wherein the link includes a first path on a physical layer of an interconnection architecture and a second path on the physical layer of the interconnection architecture. The method includes the first universal serial bus Host transferring, across the first path, link controls to the second universal serial bus Host and the first universal serial bus host transferring, across the second path, high speed data to the second universal serial bus Host.

According to another aspect of the present disclosure, there is provided an apparatus for connecting a first Host and a second Host. The apparatus includes a high speed data link over a data bridge, a switching manager adapted to create temporary interconnections between the first universal serial bus Host and the second universal serial bus Host, a Network and Control Manager adapted to establish addressing and network switching, a Data Control Manager to direct the Data Exchange mechanism to transact Data and File Transfers between the first universal serial bus Host and the second universal serial bus Host and a detector to detect that a device has been coupled to the apparatus.

BRIEF DESCRIPTION OF THE DRAWINGS

A more complete understanding of aspects of the present application is to be derived from the detailed description provided herein and from the accompanying drawings relating to some embodiments of the present application, which, however, are not to be understood as limiting to the specific embodiments as detailed, but are for the purposes of illustration to help better explain and for clarity in understanding the present application. Reference will now be made, by way of example, to the accompanying drawings which show example implementations; and in which.

DETAILED DESCRIPTION OF THE EMBODIMENTS

Figure 1:
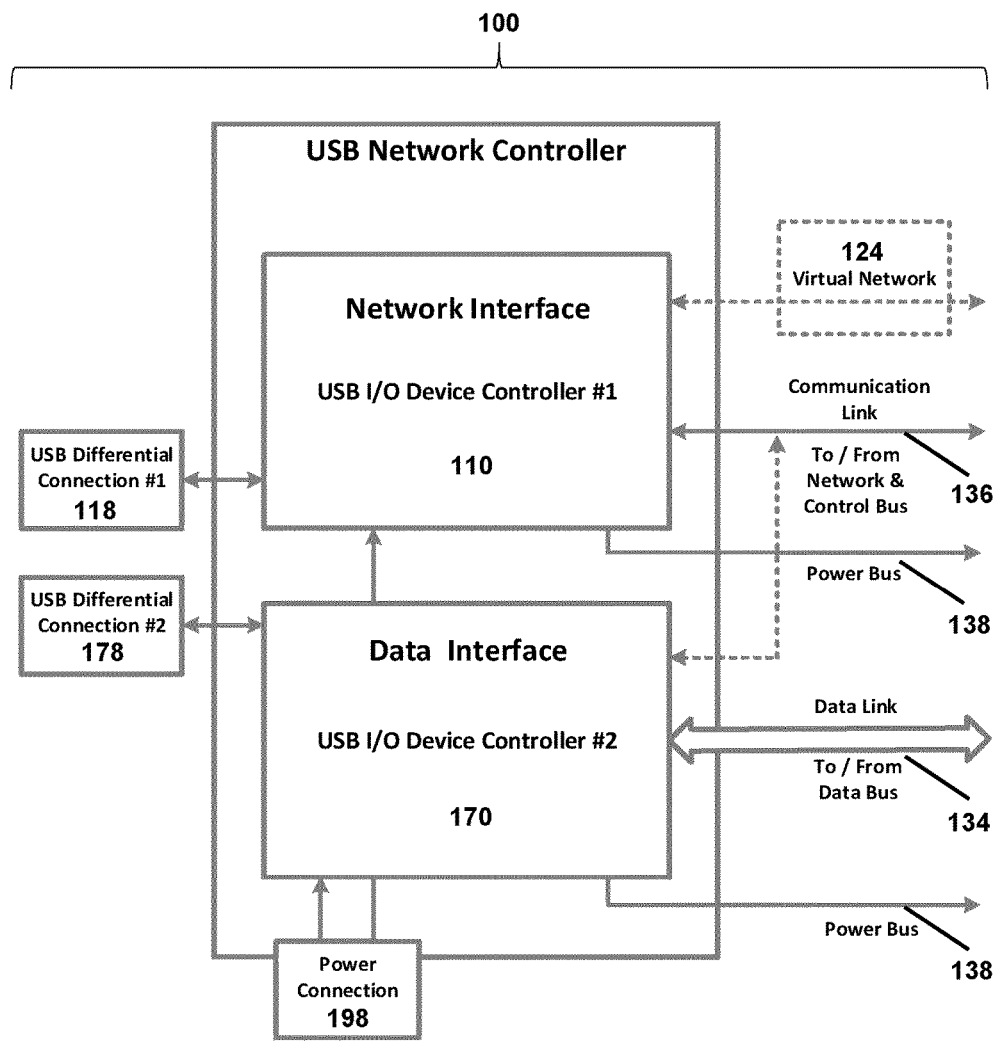
FIG. 1a illustrates, in a schematic diagram, a USB Network Controller in accordance with aspects of the present application.
FIG. 1b illustrates, in a schematic diagram, a USB I/O Device Controller for Network and Control Management in accordance with aspects of the present application.
FIG. 1c illustrates, in a schematic diagram, a USB I/O Device Controller for Data Management in accordance with aspects of the present application.
Figure 1:
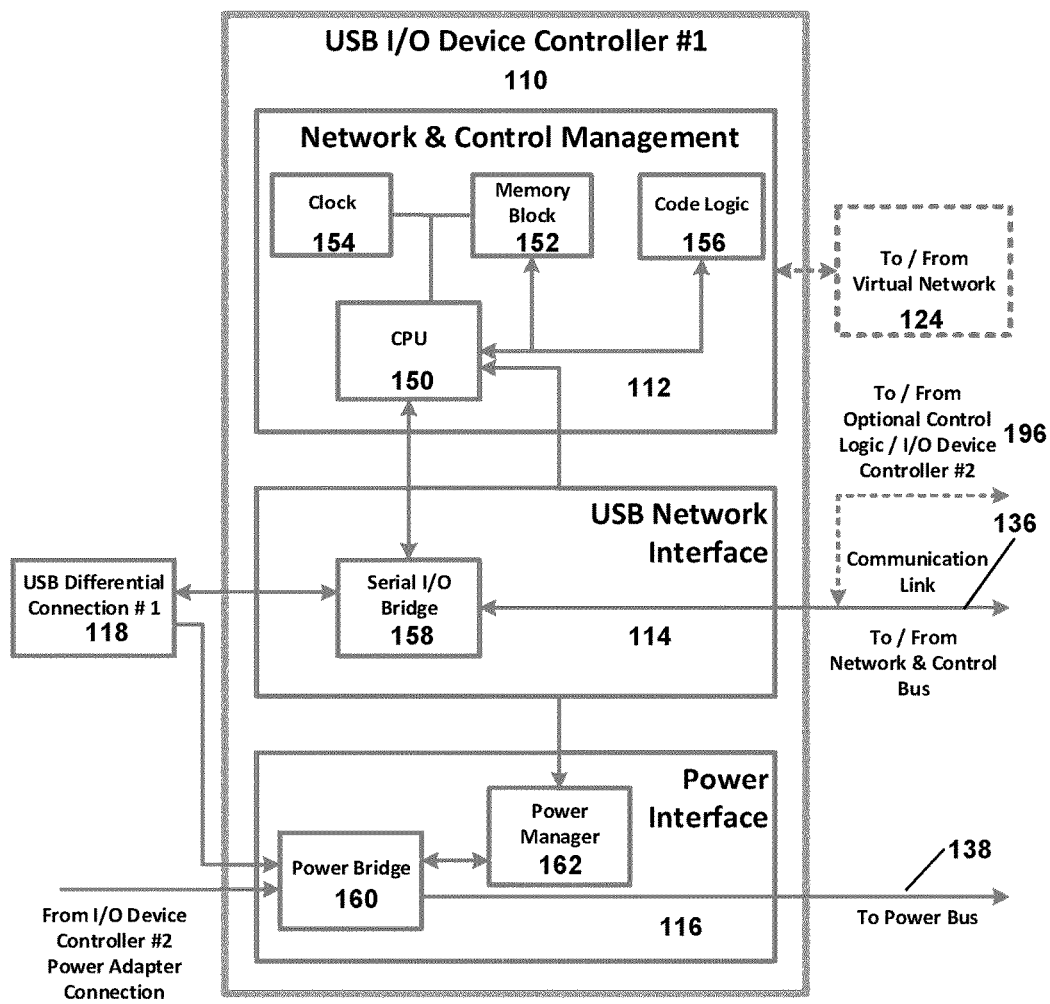
Figure 1:
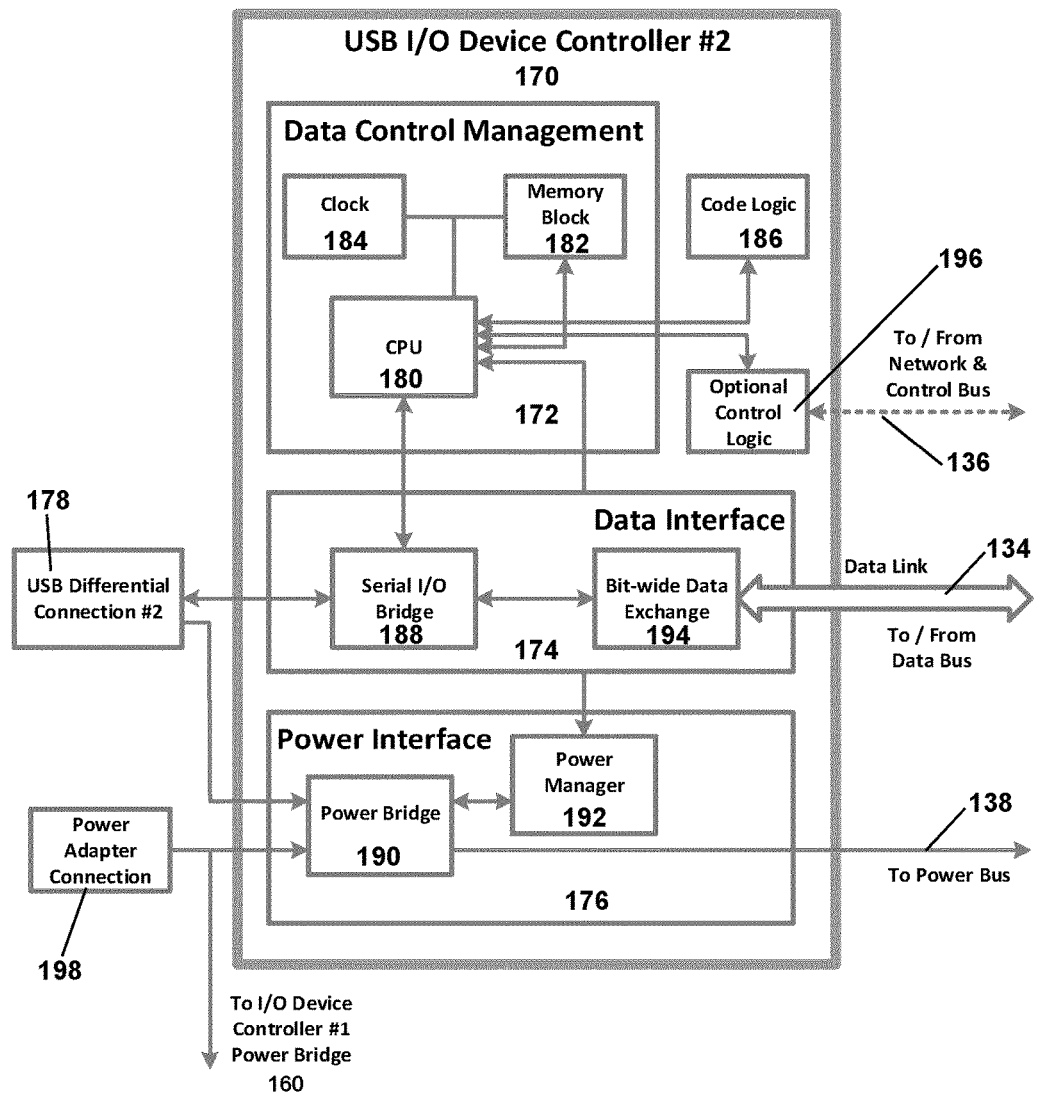

Aspects of the present application, in some embodiments, wherein the peripheral communications protocol, and supporting connectors, device controllers, linking mechanism and components, are described in reference to an implementation of the USB protocol, may equally refer to another peripheral communications protocol such as PCI, and its derivatives, SCSI or other communications protocols designed for Host to Device communications.

Aspects of the present application, in some embodiments, wherein Host is synonymous with Host system and USB Host, relate to USB Host to Host and Host to multi-Host communications and networking;

Aspects of the present application, in some embodiments, wherein USB Network Interface relates to USB Link System comprising of two or more coupled USB Network interfaces for USB Host to Host and to USB Host to multi-Host Link communications and networking.

Aspects of the present application, in some embodiments, wherein USB Network Interface relate to the latest version USB (USB 3) USB Link System comprising of two or more coupled USB Network interfaces for USB Host to Host and to USB Host to multi-Host communications and networking.

Aspects of the present application, in some embodiments, relate to USB Host-to-Host Link System and/or Bridge and/or Switch and Host-to-multi-Host Link System, and/or multi-Host Bridge and/or multi-Host Switch.

Aspects of the present application, in some embodiments, relate to a system wherein two or more USB Network Interfaces are coupled and form a Link System wherein links are formed and/or established.

Aspects of the present application, in some embodiments, relate to a system wherein two or more Host systems are coupled by and/or through a Link System and links and or bridges are formed and/or established.

Aspects of the present application, in some embodiments, relate to a system wherein two or more USB Network Interfaces are coupled and form a Link System wherein a Link System includes several individual links to the first Host, and several other individual links to a second Host to form links or bridges between the Hosts and/or USB Network Interfaces when coupled.

Aspects of the present application, in some embodiments, relate to a system wherein two or more Host systems (computers) are coupled by and/or through a Link System wherein a Link System includes several individual links to the first Host, and several other individual links to a second Host and/or other Hosts to form links or bridges between the Hosts systems when coupled.

Aspects of the present application, in some embodiments, relate to a system wherein two or more Host systems are coupled by and/or through a Link System wherein a Link System includes several individual links to each of several hosts in which various links or bridges are formed between any two or more coupled hosts, in a multi-bridge or data switch configuration.

Aspects of the present application, in some embodiments, relate to a system wherein a bridge or data switch configuration provides for communications between any two coupled hosts, and separately and simultaneously between any two other coupled hosts, in that multiple individual bridges or linked data paths can be established ad hoc.

Aspects of the present application, in some embodiments, relate to a system wherein a bridge or data switch configuration provides for communications and networking between any two or more coupled hosts, and separately and simultaneously between any two or more other coupled hosts, in that multiple individual multi-host bridges or linked data paths can be established ad hoc.

Aspects of the present application, in some embodiments, relate to a system wherein a bridge or data switch configuration provides for communications and networking between any host to be bridged with any number of other coupled Hosts at the same time in a one-to-many Host configuration or a broadcast type configuration.

Aspects of the present application, in some embodiments, relate to a system wherein a bridge or data switch configuration provides for communications and networking between any number of coupled hosts to be simultaneously bridged with any one coupled Host at the same time in a many-to-one Host configuration or convergence-type configuration.

Aspects of the present application, in some embodiments, relate to a system wherein a bridge or data switch configuration includes and supports port-to-port and port-to-multi-port and or Host to Host and Host to multi-Host configurations providing direct, any-to-any, one-to-many, many-to-one, one-to-cascaded-many, one-to-any in hunt group, third-party coupling, and expansion to additional parallel or daisy-chained Link Systems.

Aspects of the present application, in some embodiments, relate to a system wherein a bridge or data switch configuration in router mode provides a means to link coupled Hosts belonging to one separate and distinct network with coupled Hosts belonging to another separate and distinct network.

Aspects of the present application, in some embodiments, relate to a system wherein a bridge or data switch configuration in router mode provides a means to link coupled Hosts belonging to one separate and distinct network or virtual network with coupled Hosts belonging to another separate and distinct network or virtual network.

Aspects of the present application, in some embodiments, relate to a system wherein a system includes a first Host and a second Host. The first host, upon being connected, detects the Link System and a connection is established. The second host, upon being connected, detects the Link System and a second connection with the Link System is established, after which a bridge connection through the Link System is established, and thereby coupling or connecting the first Host with the second Host. Indeed, many more than just the first Host and the second Host may be connected in this manner.

Aspects of the present application, in some embodiments, relate to a system wherein a system includes a first Host system, a second Host system, and a Link System. The Link System includes a detector to detect the established connection to the first and second Host systems and the Link System logic establishes two or more bridge connections from the first Host system to the second Host system through the Link System. Indeed, many more than just the first Host system and the second Host system may be connected in this manner, with potential for multiple Host systems, multiple Link Systems and multiple bridges.

Aspects of the present application, in some embodiments, relate to a system wherein a system includes a first Host system, a second Host system, a Link System, a coupling condition, and a virtual network. The Host systems include a detector to detect the coupling condition through the Link System, and the Host logic establishes a virtual network connection or bridge to the second Host system as a response to the detection condition. Indeed, many more than just the first Host system and the second Host system may be connected in this manner, with potential for multiple Host systems, multiple Link Systems, multiple coupling conditions and multiple virtual network, network connections or bridges.

Aspects of the present application establish a method for transferring data between two or more coupled Host systems; wherein a Link System employed comprises two or more separate and distinct paths on the physical layer of an interconnection architecture; wherein the established paths are wired, wireless, virtual, or a combination of same; wherein high speed data is transferred between Host systems across enumerated Universal Serial Bus channels, and wherein network and link controls are provided via one or more secondary or other, alternate communications path or paths on the same bridged link, separate from the path or paths establishing other bridged links for high speed data communications.

In some embodiments, wherein a Host system coupled via a Link System is detected, two or more ports or Host controllers of the detected Host system are negotiated with, and it is determined whether to operate with the detected Host system in response to the negotiating. Notably, the two or more ports or Host controllers may comprise one or more endpoints.

In some embodiments, Host logic allows operation as a Host system and with a coupled Host system, and a detector detects a coupled Host system via Link logic and determines whether to operate with the detected Host system and the Host logic on the detected host responds to the Link logic; and wherein Host logic resides on the Host systems and Link logic resides on the Link System. Notably, there may be multiple Hosts systems and potentially multiple Link Systems.

In some embodiments, a cable device assembly or Link System couples a first Host system and a second Host system. The second Host system includes Host logic to allow operation as a Host system, and a detector to detect a coupled cable device assembly or Link System, and to indicate whether the Host logic is to be coupled to the cable device assembly or Link System. Indeed, many more than just the first Host system and the second Host system may be connected in this manner.

In some embodiments, a coupling condition of a cable device assembly or Link System is detected, and an indication as to whether to couple with the attached Host system or Host systems is made in response to the detecting.

In an aspect of the present application, wherein more than two USB Host systems require coupling, the Link System takes on the role of a USB Data Bridge or USB Data Switch in terms of configuration, whereby coupled USB Host systems are interconnected through a series of Links on a main USB Network Bus or Buses; through the interconnection of a series of Links and or Buses, a basic configuration of the Link System may be expanded in many aspects.

In some embodiments, multiple USB Host systems are coupled by implementing multiple Link Systems between USB Host systems in a daisy-chain configuration wherein all USB Host systems, except those located at the ends of the chain, employ an additional USB Host Controller and additional USB ports. The additional USB Host Controllers may serve as an extension or bridge to the other separate Link Systems in coupling adjacent USB Host systems to both the network and the data links and facilities.

In some embodiments, multiple USB Host systems are coupled by deploying a number of separate Link Systems to a centrally located USB Host system, wherein a number of USB Host Controllers and USB ports are deployed, to establish a star configuration wherein all coupled USB Host systems are interconnected in a Server-Client environment in which the centrally located Host system emulates the aforementioned bridge/data switch configuration.

In some cases, according to aspects of the present application, multiple USB Host systems are connected via a mix of daisy-chain, star, mesh and bridge/data switch interconnect configurations; in this manner, elaborate network structures can be created and implemented in either fixed or ad hoc installations.

In some embodiments, a dedicated hardware-based implementation may be made, for example, in file sync applications. For example, in some embodiments, a personal computer or a Home Entertainment System can connect to a notebook computer or tablet system using a USB Type-A to USB Type-A cable with an embedded Link System for fast connection speeds and transfer of data and/or information.

Some aspects of the present application may allow a device with a connection to a USB Host system to "push" data in controlled situations, particularly when the data is stored as a large file, as is common to media applications, wherein a user connects to a Host to rent or purchase movies, video, music, documents, and/or other media, etc. For example, in some embodiments, distribution of music and/or video downloads (for example, interactive DVD, HD-DVD, Blu Ray, etc.) at high speeds (for example, USB 3 speeds) via kiosk type implementations, for media retailing in locations such as airports, convenience stores, etc.

In some embodiments, a USB 3 Host system may appear to be and may operate as a USB 3 device and may enable what would appear to be a Host to Host connection to be made, such that the coupled USB 3 Host system becomes transparent to a user. In some embodiments, standard features (systems included as part of the Host system OS), such as a USB mass storage device driver, a device letter, and/or a file drag and drop feature, may be used in either Command Line Interface or in Graphical User Interface to provide a means by which content can be moved or copied between two USB Host systems. Additional user intervention in such applications would not be required in conjunction with the use of these standard features, thereby allowing seamless operation for features such as Sync-and-Go, or scheduled backups.

In some embodiments, a file transfer may be initialized and controlled by a storage facility that acts as a USB Host system, that supports two or more coupled USB Hosts systems, and that may serve as a means to augment a current local area network and/or a file storage facility and/or a file sharing facility. For example, a file transfer may be initialized and controlled by a network storage device in a user's home to bridge fixed-place devices and portable devices, and/or as a file sync facility for daily document management in commercial applications.

Aspects of the present application may cause two or more servers to connect; wherein each connected Host system (server) remains fully operational and able to control operations on other Host systems, including, but not limited to, file transfer, virus invigilation, other file processing or operations.

In some aspects of the present application, a Host to Host connection supports the provisioning of a shared environment such as a virtual host or other sharing of system resources including but not limited to other attached USB Devices and other network attached devices (for example a USB thumb drive, or a Network Attached Storage unit (NAS).

In a particular embodiment, a USB Host system, usually a smaller system such as a mobile phone, tablet or similar, may be provided with a dock, or similar resting point, may employ aspects of the present application to cause the establishment of a network connection to other USB Host systems, and/or devices. Connecting using aspects of the present application may be considered to support sync-n-go, system resource sharing, sharing of hardware features such as touch interfaces, and other components, whether implemented automatically at connection, or via user control.

Some aspects of the present application may employ USB 3.0 or USB 3.1 Host systems. In other aspects, other USB versions, such as USB 2.0, can be used to provide same or similar performance. Future versions and/or implementations are contemplated, using USB and/or other high speed or fast bus implementations and protocols.

While some embodiments have been described with regards to particular implementations, in accordance with some or other embodiments, other implementations are possible. In addition, the order, composition and/or format of components, circuit elements or other features represented in the drawings and/or described herein are not necessarily required to be arranged in the particular way as represented or described herein. According to some embodiments, other arrangements are possible.

Terms such as "coupled" and "connected" used herein, may be replaced by any derivative such as "bridged." Although seemingly having a similar contextual definition, these terms are not intended as interchangeable replacements for one another. More specifically, in particular embodiments, "connected" may be used to indicate that two or more entities and/or elements and/or units are in direct physical or electrical contact with each other, wherein "Coupled" and/or "Bridged" may mean that two or more entities are in direct physical or electrical contact; and where "Coupled" and/or "Bridged" may also mean that two or more entities and/or elements and/or units are not in direct contact with each other, but exist and/or interact in a co-operative bind with each other.

Terms such as "block" and "unit" are used herein, may be replaced by any derivative such as "element." Although seemingly having a similar contextual definition, these terms are not intended as interchangeable replacements for one another. More specifically, in particular embodiments, "block" may be used to indicate that two or more entities and/or elements and/or units are in relation to one another, wherein "unit" may mean two or more entities and/or elements and/or units are in relation to one another and that two or more entities and/or elements and/or units are not in relation to one another other, but exist and/or interact in a co-operative bind with each other.

Some aspects of the present application may be implemented in one or any combination of hardware, firmware, and software. Some embodiments may employ a computing platform to perform the operations described herein whereby instructions may be read and executed after having being stored on a machine-readable medium. Machine-readable media may include any mechanism that can store and/or transmit information in a form readable by a machine (for example, a computer). For example, a machine-readable medium may include one or more of the following: read-only memory (ROM); random-access memory (RAM); magnetic disk storage media; optical storage media; flash memory devices; electrical, optical, acoustical or other form of propagated signals (for example carrier waves, infrared signals, digital signals, the interfaces that transmit and/or receive signals, etc.), and others.

Accordingly, while some diagrams may have been used herein to describe particular embodiments and/or implementations thereof, the present application is not intended to be limited to those diagrams and/or to corresponding descriptions herein. That is to say, the indicated movement or direction of any process or connection need to be or need not to be with or through each illustrated box or connection point or entity, or to be or not to be in exactly the same order as illustrated and described herein.

In some embodiments, a USB Host may be used to operate as a USB device, wherein the connection from one USB Host system to another USB Host system coupled either directly through a Link System or by means of an alternate Network system so as to allow what would appear to be a Host-to-Host connection established in a manner which may be transparent to a user. In some embodiments, standard features normally associated with those being provided by the Host system Operating System, including interaction with USB Devices using a USB mass storage device driver, device letter, and/or file drag and drop features, may be used to move or copy content between two Host systems. Integration with these standard mechanisms allows existing applications such as Sync and Go to work seamlessly and without the requirement of any additional user intervention. This aspect of the present application can be considered advantageous in that system and peripheral resource sharing for applications in consumer, commercial and industrial scopes are considered high value for all facets of connectivity and storage solutions and for virtualization solutions.

Accordingly, while some embodiments are described herein as USB 3 embodiments, other aspects of the present application may not require these particular implementations. For example, some implementations require other USB embodiments such as USB 2.0 and, likewise, it is also contemplated that future or alternate versions and/or implementations of USB and/or other fast bus implementations such as PCI, and its derivations, SCSI or others thereof, may be performed according to some aspects of the present application.

Accordingly, with regards to each system shown in a figure herein, the elements within the figure, in some cases, may each have a same or a different reference number, so as to suggest that the elements represented could be similar, same and/or different. Notwithstanding, an element may be flexible enough to have different implementations and remain working with some or all of the systems shown or described herein. The various elements shown in the figures, may be the same or different. Which one is referred to as a first element and which is called a second element is in some cases arbitrary.

Accordingly, to some embodiments, USB 3 provides additional features including a bus training sequence used to establish the communications between USB ports, as part of the response to detecting a connection. Upon initial connection of the aspects of the present application, there is an exchange of information between the Host system controllers and Link System controllers as is the case whenever a USB device is connected to a USB Host port (for example, a USB Scanner to a USB Host or a USB Device to a USB Hub). Host system controllers will declare themselves as downstream ports (as in the normal manner) and Link System controllers will declare themselves as upstream ports (in a manner similar to a USB Device). This allows the Host system at either end of the Link System to act as a Host while both are connected, seemingly, to each other, although, physically through the Link System which appears as USB Devices to each of the respective connected Host systems. In this manner a USB 3 peer-to-peer connection is possible, and a full scale peer-to-peer network is also possible.

In some aspects of the present application, USB implementations use differentially driven receive block logic as well as differentially driven transmit block logic at either end of a coupled Link System, whereby the Network Manager appoints opposite ends as either the sender or the receiver as per the user interface Application's request. Additionally, in some embodiments, a USB interconnect may include two more differential pairs or multiple differential pairs which can be used and in some embodiments are used, for link management (for example Network and Control Management) and/or other lower speed and bandwidth data communications.

Accordingly, in some embodiments, since USB 3 is a dual simplex connection that supports concurrent IN and OUT transactions, a transmitter and a receiver block logic may be included in a Host system, and therefore beneficial to have the same in the Link System as block logic such that communications for each individual host is performed separately and simultaneously with the Link System whether or not a data transfer is executing at the time.

Accordingly, in some aspects of the present application, two USB Host systems (for example, two USB 3 Host systems) can be connected and/or coupled together via the Link System, wherein for example, in some embodiments, a personal computer (PC) configured as HTPC (Home Theater PC) can be connected and/or coupled with a tablet computer (for example, an iPad™ from Apple Inc. of Cupertino, Calif.) via a USB connection. In some embodiments, a high bandwidth connection is made between systems wherein it is ideal for transferring large media files in extremely short times. For example, such a high bandwidth connection is used for rapid transfers of large media files containing standard definition (SD) content and/or high definition (HD) content (for example, from a personal computer to a notebook computer for later playback). In some embodiments, the high bandwidth connection does not require any specific or additional support from a specification (for example, from a USB specification such as a USB 2.0 or a USB 3.0 specification). In some embodiments, the high bandwidth connection uses unmodified USB type-A receptacles (for example, unmodified USB 3.0 type-A receptacles). In some embodiments, the operation of the high bandwidth connection is transparent to the user. In some embodiments, existing USB device class drivers may be used (for example, existing USB 3 device class drivers). In some embodiments, Host systems having ports with capability for such a high bandwidth connection may connect to a Link System for such an implementation.

In some aspects the present application, aspects can be delivered in a product form that would match the benefits of a passive crossover cable (for example, passive USB crossover cable such as a passive USB 3.0 crossover cable) and may be used for the purpose of connecting two Host systems with the desired intention to transfer data back and forth between the coupled Host systems. The user's perspective, would be one of a seamless nature, in that the connection between two Host systems (for example coupled together by means of aspects of the present application configured as a Link System) would simply work whenever the cable is plugged in to each Host system. Sync and Go applications based on drive letter addressing, simply work. In the manner as described, the throughput efficiency is very high in that the Link System is serving and communicating directly with only two Host systems; saving valuable bandwidth and Network Management resources as would occur if deploying over an IP based protocol.

In some embodiments, performing may be considered synonymous with appearing to act, such that one Host system may perform as a host and the second Host system may perform as a device, and on command, one Host system may alternate to performing as a device, while the second Host system, in synchronized manner, may alternately perform as a host. In some embodiments, two Hosts each act simultaneously as both a host and a device. For example, a Host system can in some embodiments perform simultaneously as both a host and a device.

In some embodiments, performing may be considered synonymous with appearing to act, such that a device configured as a bridge cable, comprised of a Link System situated in between the USB Male-A to USB Male-A connectorized cables, coupling the Host systems, perform as would an entirely passive cable (for example, a crossover cable). In some embodiments, the control hierarchy (which is to say, which Host system will perform as the conventional host and which shall perform as the conventional device) may be established using, for example, hardware and/or hardware controlled by software, at one or both of the coupled Host systems. In some embodiments, the host performing as the host and the host performing as the device, can be dynamically swapped using hardware and/or software and/or both, at one or both of the Host systems.

In some embodiments, performing may be considered synonymous with appearing to act, such that a device configured as the Host system may be presented to the coupled Host system as a Mass Storage Device, and/or performing as having a connection with a directly attached storage subsystem, wherein storage capability is provided.

In some embodiments, performing may be considered synonymous with appearing to act, such that a device configured as the Host system may be presented to the coupled Host system as an Ethernet emulation mode communication device and/or interface, and/or performing as facilitating the establishment of network addressable access, and/or network addressable access to other network addressable devices such as a network attached storage (NAS) subsystem, wherein storage capability is provided.

In some embodiments, performing may be considered synonymous with appearing to act, such that a device configured as the Host system may be presented to the coupled Host system as a device. For example, in some embodiments, the coupled Host system performs as a storage hard disk drive (HDD) having an OS generated and/or recognizable and/or compatible drive letter, just as it would see any other USB storage device such as a USB thumb drive, wherein the coupled Host system requires no additional hardware or software to participate in a peer to peer connection. Logic may be resident at the coupled Host systems and within the Link System therein.

In some embodiments, performing may be considered synonymous with appearing to act, such that a device configured as the Host system may be presented to the coupled Host system like any other network addressable host or file server (for example, a computer), and from the perspective of the Host system the coupled Host system may be presented like any other network addressable host or file server (for example, a computer). In some embodiments, the network interface may be generated by software (for example, a device driver) on the Host system, and presents the file system in the same manner as any direct attached network host or file server, or network attached storage (NAS) system. The driver may optionally present only a subset of the file system (for example, the user's "My Documents" directory).

In some embodiments, performing may be considered synonymous with appearing to act, the Link System may perform as if employing the USB over IP protocol, although not employing the USB over IP protocol, which is known to have inherent large overhead issues affecting operational factors and transfer speeds. The present application is not intended to be limited to or preclude implementations from including and/or using such protocol either exclusively or inclusively as a supplemental protocol for any desired or required design criteria.

Notably, much the same could be said about the Link System performing as if employing the "IP over USB" protocol, in that aspects of the present application may involve performing as if employing the IP over USB protocol and, although it is not being employed, it is understood that implementations are not limited to or precluded from being employed by aspects of the present application or from being included and/or using such protocol either exclusively or inclusively as a supplemental protocol for any desired or required design criteria.

Aspects of the present application may be considered to relate to a dual interface, such that some aspects may be implemented physically as a device, these aspect may then appear as a Host at the Application level, thereby provisioning a Virtualized Host system with the ability to connect to devices and other Hosts, both physical and virtual.

Aspects of the present application provide an ability for any coupled Host system to connect to multiple separate and distinct Link Systems. As such, the number of separate and independent data links to one or many other Host systems may be seen to increase, such that the aggregate high speed data transfer throughput is equal to the sum of all of the transfer speed capability of each of the attached Link Systems. For example, if any one Host system is attached to any one other Host system, using four separate and independent bridged peripheral connection pairs supporting the data transfer, using a separate and distinct Host controller for each of the attached bridged peripheral connection pairs by both Host systems, whereby the average transfer speed on any one data link through a Link System is 400 MB/s, the total potential throughput in this implementation would approximate 1600 MB/s. Aspects of the present application may be seen to include facilities to transfer one file using all available data links, or multiple files simultaneously using all available data links. Other facilities could be included to use any number of the available data links in this type of embodiment, as "Send Only" data links, with all other data links set as "Receive Only" data links. Other functionality can be included to switch any data link function (i.e., "Send Only") to any other data link function in an ad hoc manner. Embodiments of a similar nature could be used whereby relaying or routing of data to more than one Host system would provide higher throughput for applications requiring real time duplication or redundancy. This aspect of the application can be considered as advantageous in that high speed data transfers may be provided for applications in consumer, commercial and industrial scopes at lower cost points than current competitive solutions.

Aspects of the present application provide for establishment of a Link System deployed as a virtual Host system, such as that commonly deployed as a Zero Client, in which a virtual host is implemented via a Multi-Seat Host OS, System/application, in which the user interfaces, namely video, keyboard, mouse and audio functionality and facility are delivered to the Link System by means of the existing USB interface, and the required USB controllers are implemented within the Link System for such an embodiment. Interconnection to other Desktop or Smart Device Host systems via the USB interface to the Link System may provide a private and high speed personal network for file sync, backup, etc. Additionally, an embodiment having specific interfaces and deployed in such a manner can be construed as a Docking Station for Smart Devices such as laptops, notepads, tablets, phablets, Smart Phones, etc., whereby the user is provided a means to implement an additional and typically larger display or screen, a more accommodating keyboard, mouse and audio devices. Provisioning to the home or corporate network can also be established through the Link System, with options for local and faster storage, and common or shared file storage, or for access to cloud based storage.

Aspects of the present application, in some embodiments, relate to a system wherein a device bridge provides for direct logical access to system resources, including CPU, Memory and hard drive, as well as peripheral resources such as printers, scanners and other devices; and wherein direct access to system resources eliminates protocol conversions required by other network methods and protocols, such as Ethernet. Connections established via a bridged hub connection may further establish default pools of privately shared resources available to any connected Host without user or system intervention. This aspect of the present application can be considered advantageous in that system and peripheral resource sharing for applications in consumer, commercial and industrial scopes are valuable for virtualization and other connectivity solutions.

The described implementations herein of the present application are intended to be examples only, and when employing USB 3.1 version of the protocol, any and or each of the USB connectors referenced herein may be implemented as a USB 3.1 Type-C connectors.

The described implementations herein of the present application are intended to be examples only. Alterations, modifications and variations may be effected to the particular implementations by those skilled in the art without departing from the scope of the application, which is defined by the claims appended hereto.

FIG. 1a illustrates, in a schematic diagram, a USB Network Controller 100 in accordance with aspects of the present application. As illustrated, the USB Network Controller 100 may include at least two USB differential pair connections or ports 118 and 178 respectfully (for example a USB 2 differential pair connection or port 118, or a USB3 multi-differential pair connection or port 178) each of which is communicatively connected to USB I/O Device Controller #1 110 and USB I/O Device Controller #2 170 respectively, which provide a Communication Link 136 and a Data Link 134 respectively along with combined Power Links 138 with an optional separate external Power supply port 198; to establish interconnection with one or more USB Host systems, and where upon a Virtual Network 124 may be established upon coupling with one or more USB Host systems. Each USB I/O Device Controller #1 110, and USB I/O Device Controller #2 170 is illustrated in FIGS. 1b and 1c respectively.

FIG. 1b illustrates, in a schematic diagram, a USB I/O Device Controller #1 110 in accordance with aspects of the present application. As illustrated the USB I/O Device Controller #1 110 may include Network and Control Management 112, a USB Network Interface 114, and a Power Interface 116. The Network and Control Management block 112 may be comprised of various elements; a Code Logic block 156, a Memory Block 152, a Clock 154, each of which is communicatively connected to each other and additionally to a Central Processing Unit 150 (hereinafter "CPU") and also interfaces directly with the Serial I/O Bridge 158 in the USB Network Interface block 114 and additionally with the Power Manager 162 of the Power Interface block 116. In accordance with aspects of the present application the USB I/O Device Controller #1 110 may establish a Communication Link across the Network and Control Bus 136 for coupling with the USB I/O Device Controller #1 110 of one or more other USB Network Controllers 100. Additionally, a Power Bridge 160 may provide Vbus Power and or an optionally provided external power source to the shared Power Bus 138 via the Power Manager 162 as may be directed by the USB Host system application, should the need be presented. The various elements of the USB I/O Device Controller #1 110 may further include the establishment of a connection to the Virtual Network 124 which may be seen as a virtual connection and used as a real IP Network formed between any or all of the coupled USB Host system(s) to any other coupled USB Host system(s).

FIG. 1c illustrates, in a schematic diagram, a USB I/O Device Controller #2 170 in accordance with aspects of the present application. As illustrated the USB I/O Device Controller #2 170 may include Data Control Management 172, a USB Network Interface 174, and a Power Interface 176. The Data Control Management Block 172 may be comprised of various elements; a Memory Block 182, a Clock 184, each of which is communicatively connected to each other and additionally to a Central Processing Unit 180 (hereinafter "CPU") and interfacing with a Code Logic Block 186 and an Optional Control Logic block 196, both of which may be located externally of the Data Control Management Block 172; and may also interface directly with the Serial I/O Bridge 188 in the USB Network Interface block 174 and additionally with the Power Manager 192 of the Power Interface block 176. In accordance with aspects of the present application the USB I/O Device Controller #2 170 may establish a Data Link across the Data Bus 134 for coupling with the USB I/O Device Controller #2 170 of one or more USB Network Controllers 100. Additionally, a Power Bridge 190 may provide Vbus Power and or optionally provided external power to the shared Power Bus 138 via the Power Manager 192 as directed by the USB Host system application, should the need be presented. The various elements of the USB I/O Device Controller #2 170 may further include the establishment of an optional connection from the Optional Control Logic block 196, to establish a Communication Link across the Network and Control Bus 136. One of the main features of the USB I/O Device Controller #2 170 is the ability to adapt or convert incoming USB 3 formatted data through the Serial I/O Bridge 188, which may then be altered to suit Bit-Wide delivery options ranging from 4 to 64 as directed by means of the Bit-Wide Data Exchange 194. This conversion process may also be deployed in the opposite direction such that Bit-Wide Data may be adapted or converted to USB 3 format for compliance with the USB 3 protocol.

In operation, the USB Network Controller 100 may allow for a link between a USB Host system and a USB Network Bus to be provisioned. Furthermore, the USB Network Controller 100 may be useful when establishing a non-standard USB communications architecture, permitting one Host system to be directly connected to another Host system in typical computer network topologies and interconnections. The USB Differential Pair(s) Connections or ports #1 118, and #2 178 may facilitate interconnection with a standard USB Host system (for example, a computer system) via a standard USB or USB 3 cable. The Power connection 198 may facilitate an interconnection with a standard external power source as a means for more or supplemental power. The Link System interface buses including Network and Control Bus 136, the Data Bus 134, the Power Bus 138 may facilitate interconnections with the USB Network Bus, other buses, routers, switches and other similar or dissimilar networks.

As is illustrated in FIG. 1b, the Network and Control Management block 112 may facilitate a means by which a connection management system may be deployed to bridge USB Host system communications with the USB Network Interface, for the purpose of interconnecting with and to other coupled USB Hosts systems through a Link System comprised of two or more coupled USB Network Controllers 100. The Network and Control Management block 112, may function as a traffic manager, wherein various communication paths physical and virtual are established when USB Host systems are coupled through the Link System with each communication path having specific and distinct operating functions and processes.

The Network and Control Management block 112 may receive and issue commands. Additionally, the Network and Control Management block 112 may detect and negotiate with the various systems within the USB Network Controller system 100 and, externally, with a coupled USB Host system, the Link System and the optionally provisioned internal Console port within the Code Logic 156, and other coupled USB Hosts and/or devices.

The Data Control Management block 172 as shown in FIG. 1c may interact with the Bit-Wide Data Exchange unit 194 may enable fast bus communications for high speed data and file transfers with the Link System, performing data direction selection and path routing and switching; and executing data flow and data speed alterations as instructed by the Data Control Management block 172, and in collaboration with the direction of the Network and Control Management block 112. The Data Interface unit 174 may accommodate transfers of command and control instructions and data, but does so as a secondary and/or simultaneous parallel service, thereby supplementing its main service which is specifically to provision USB and USB 3 high speed data and file transfers. Aspects of the present application include separate and distinct paths within the USB Link System. The Link System Data Bus may be connected to the USB I/O Device Controller #2 170 to enable fast, efficient and directed data delivery to and from the USB Network Interfaces 100, since control and addressing functions may mainly be provisioned by the USB I/O Device Controller #1 110 connected to the Control bus of the USB Network.

The Code Logic blocks 156 and 186 may be configured to store machine code data for use by the Network and Control Management block 112 and the Data Control Management block 172 relating to configuration, process execution, and data path and handling instructions.

The Virtual Network block 124 may be established as a pseudo-Control Manager within the coupled USB Host systems wherein functional network commands are carried out in sync with those issued at the Link System level. Functional network commands relate to control sequencing and operational functions provisioned by and through the Network and Control Management block 112, and the Data Management block 172, between coupled USB Hosts systems, and transacted on the Link System, as directed by the Network and Control Management block 112, from user interaction at the USB Host system(s) Application level.

Other aspects of the present application may include a pre-processor unit and/or a postprocessor unit and/or both, placed or located anywhere prior to the Bit-Wide Data Exchange unit 194 in the case of a pre-processor and/or placed anywhere after the Bit-Wide Data Exchange unit 194 in the case of a post-processor and/or a mix of both as per design criteria. For example a buffer, a multiplexer/demultiplexer (mux/demux), a serializer/deserializer (SERDES), a data converter, a bit converter, a bit checker, etc. Notably, Fiber Optic Cable may be employed as the USB Transmission Line, with a benefit of reducing distance limitations as well as noise interference and signal degradation typically associated with high speed bus transmissions over copper-based cable.

Figure 2:
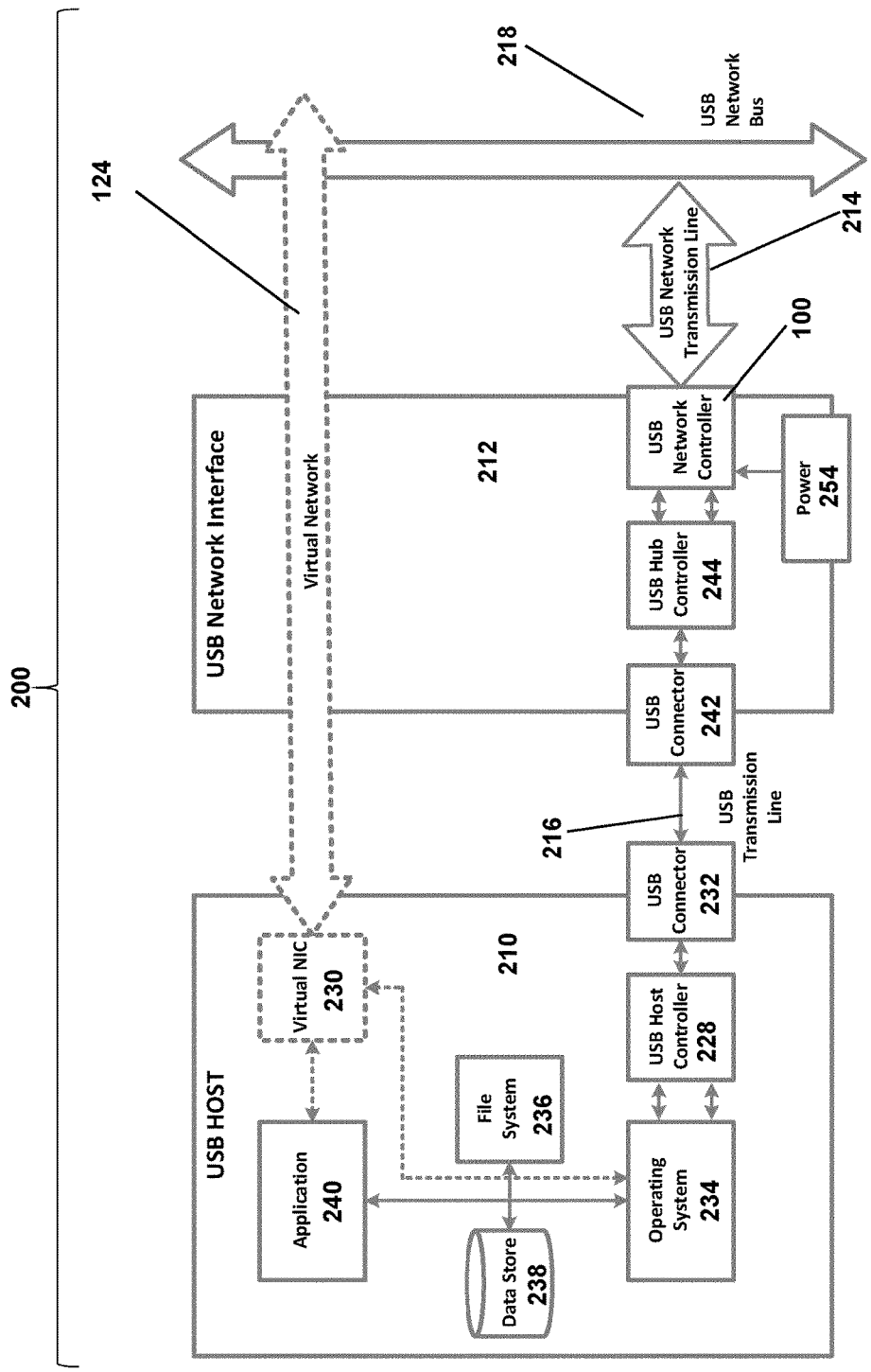
FIG. 2 illustrates a Link System in which an example USB Host system is illustrated along with the USB Network Interface comprising a USB Network Controller of FIG. 1a in accordance with aspects of the present application.

FIG. 2 illustrates a Link System 200 in which two or more USB Host systems 210 may be coupled in a fully addressable and managed Network architecture by deploying a USB Network Interface 212 over a shared USB Network Bus 218. An example USB Host system 210 is illustrated. The USB Network Interface 212, as a portion of the Link System, may provide a manner for the USB Host system 210 to connect to a USB Network Bus 218.

Aspects of the present application may include two or more network paths from the USB Host system 210 through the USB Network Interface 212 to the USB Network Bus 218. At least one of those connections may be a physical connection and all others may be either physical or virtual, or a combination of both.

In the embodiment illustrated in FIG. 2, a primary physical connection may employ a USB Transmission line 216 (for example, a USB 3 Cable including several differential pairs) connecting a USB 3 Port 232 of the USB Host system 210 (for example, a Computer) to a USB 3 Hub 244 (for example a USB3 Hub Controller) through USB Connector 242 to each of the USB and USB 3 I/O Device Controllers built into the USB Network Controller 100. The USB Host system 210 may include the necessary physical and logical components for data storage, retrieval, access, and transfer duties. The components may include: an Operating System 234; a File System 236; one or more Data Stores 238; an Application 240; a USB 3 Host Controller 228, and a Virtual Network Interface Controller (NIC) 230.

A USB Network Transmission line 214, which may be connected to the Link System interface via USB Network Controller 100, and may include a first Link to bridge a Network Bus and or a Control Bus for addressing, signaling, switching and routing signals and controls, and a second Link to bridge a high speed Data Bus, and a third Link to bridge a Virtual Network Bus 124 for application interfacing at the Host system, and a fourth Link to bridge a Power Bus for delivery to coupled Host systems or bridged device controllers for low-power or battery powered Host systems, may connect the USB Network Interface 212 to the USB Network Bus 218.

In aspects of the present application, reductions may be found in distance limitations of the physical interconnects between the USB Host system 210 and the USB Network Bus 218. As can be seen in FIG. 2, the USB Transmission line 216 may be connected to the USB Network Interface 212. In some embodiments, Copper USB cables serving as the USB Transmission line 216 may be limited to specific length dimensions, so that only minimal external and internal signal degradation may occur due to interference and differential pair signal loss on the USB Transmission line 216.

As Power and Ground signals are inclusive in USB connections, some power levels may be affected over distances and may not be sufficient as a power source for the attached Link System 200. As such, an External Power connection may be provided by way of the Power port 254.

In operation, the Application 240 may provide a user with means to perform data and file transfers by means of a network facility. In some embodiments, the network facility may be serviced by the Virtual NIC 230 which provides typical Internet Protocol type network functionality with address and port interaction in accordance with the OS 234 and Application 240 requirements.

In some aspects of the present application, the Virtual NIC 230 may be established when coupling the USB Host system 210 to the USB Network Bus 218. The coupling may be accomplished via the USB 3 port of a USB 3 Hub 244 (for example a USB3 Hub Controller) through to each of the USB and USB 3 I/O Device Controllers of the USB Network Controller 100 and via the USB Network Transmission line 214, which may be connected to the Link System interface or USB Network Bus 218. Upon coupling, the OS 234 enumerates a Virtual NIC 230, and may configure and or establish an IP address and Port on the Virtual NIC 230 which may allow for the Application 240 to interact with other coupled USB Host systems 210 presenting IP addresses on the same family and subnet. The Application may render command instructions and associated system queries of the File System 236 with respect to the data in the Data Store 238, on both the USB Host system 210 and of that of any other coupled USB Host system 210. The Application 240 also renders typical file handling and file transfer commands typically associated with modern day computing systems such as file storage listings, file directory listings, file copy, move, delete, rename, compare, sync, backup, restore, etc., within the USB Host system 210 and with or to any other coupled USB Host system 210.

The Application 240 may interact with the OS 234 of the USB Host system 210 and any other coupled USB Host system 210 seemingly via the Virtual NIC 230, but all communications concerning network and control instructions and information are conducted on the communications bridge linking coupled USB Network Interfaces 100 on the Network and Control Bus 136. All exchanges of Data from one USB Host system 210 to any other coupled USB Host system 210 may transact via the data bridge linking coupled USB Network Interfaces 212 on the Data Bus 134, thus may allow for high speed data transfers in either direction.

USB cable lengths are relatively and prohibitively short in comparison to alternate network wiring solutions (for example CAT5, CAT6, etc.); as such, the USB Host system 210 may be caused, by cable length, to be in close proximity to the USB Network Interface 212. Other inherent restrictions can impede the working distance by which the USB Network Transmission Line 214 can be accommodated, ranging from number of conductors, shielding requirements, and gauge and connector structure as the primary sources.

Provisioning of Power, as in all implementations of USB interconnects, may be derived from the USB Host system through the USB Transmission line 216 and, ultimately, via the USB port 242. In situations in which additional Power is required, optional internal or external power sources may be connected or applied through the Power port 254, connecting to the USB Network Controller 100 Power Connection 198 and then managed by either Power Manager 162 and or 192 as directed by the Network and Control Management 112, such that all systems are functioning optimally and such that any USB Host systems' data interactions are not subject to communication speed reductions.

Figure 3:
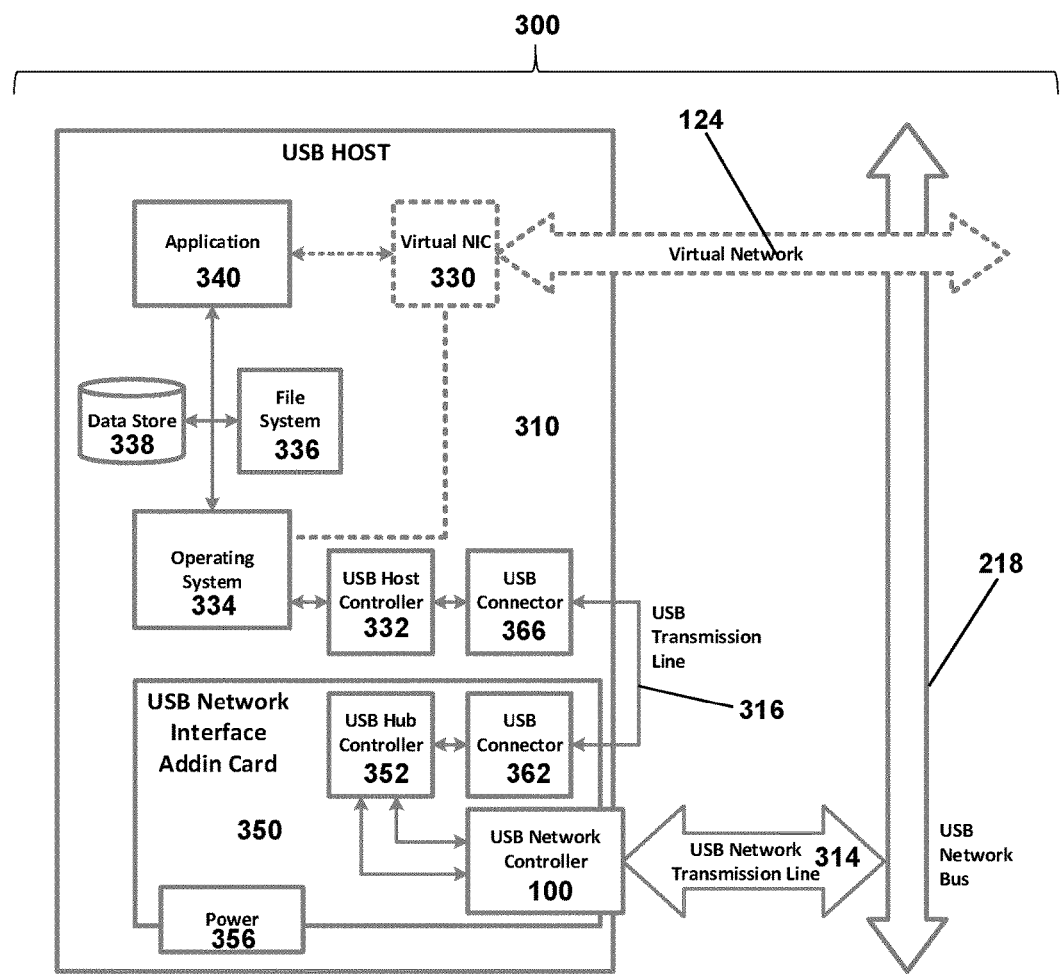
FIG. 3 illustrates a Link System as an alternative to the Link System of FIG. 2 in accordance with aspects of the present application.

FIG. 3 illustrates a Link System 300 as an alternative to the Link System 200 of FIG. 2. In the Link System 300 of FIG. 3, a USB Network Interface add-in card 350 is illustrated as internally mounted inside a USB Host system 310.

The USB Host system 310 has many of the same components as the USB Host system 210 of FIG. 2, including an Operating System 334; a File System 336; one or more Data Stores 338; an Application 340; a Virtual NIC 330; a USB 3 Host Controller 332, and a USB port 366.

The USB Network Interface add-in card 350 may have many of the same components as the USB Network Interface 212 of FIG. 2. That is, the USB Network Interface add-in card 350 may include a USB port 362 (like the USB port 242 of FIG. 2), a USB Hub Controller 352 and a USB Network Controller 100 (like the USB Network Interface 212 of FIG. 2) and a Power port 356 (like the Power port 254 of FIG. 2). The USB Network Interface add-in card 350 may be implemented as a typical add-in peripheral card. Example typical add-in peripheral cards include: an adapter card; an expansion card; an add-in Ethernet Network Interface Card; and an externally attached dongle or device.

The USB Host Controller 332 may allow the connection to the USB Network Interface add-in card 350 to connect to the USB Hub Controller 352 using the USB port 366 of the USB Host system 310, and the USB Port 362 of the USB Network Interface Addin Card 350, via a USB transmission line 316.

A USB Network Transmission line 314, which may be connected to the USB Network Controller 100, may connect the USB Network Interface add-in card 350 to the USB Network 218 in a similar fashion as outlined in Link System 200 in FIG. 2.

In operation, USB port detection, connection and enumeration by an eXtensible Host Controller Interface (xHCI) root host and/or an Enhanced Host Controller Interface (EHCI) root host within the USB Host Controller 332 may be handled by established USB specifications. Once connected and enumerated, the combination of the USB Host system 310 and the USB Network add-in card 350 form the Link System 300. Power for the USB Network add-in card 350 may be provisioned, by way of the Power port 356, directly from an Expansion Bus of the USB Host system 310 and may be managed internally by a Power Manager similar to the Power Manager 162 and or the Power Manager 192, which was described earlier, in conjunction with a review of the components of the USB Network Controller 100 of FIGS. 1a, 1b, and 1c. The physical interface from the USB Host system 310 to the USB Network 218 may be implemented through a USB Network Transmission Line 314 which, as described earlier, can be made of various buses and also interfaces virtually with the USB Host 310 by an established Virtual Network as described previously.

In some aspects of the present application, the Virtual NIC 330 may be established when coupling the USB Host system 310 to the USB Network 218. Once coupled, the USB Network Interface 114 of FIG. 1b ma be detected within the Application 340, and the OS 334, may enumerate the I/O port and thereafter may enable the Virtual Network driver within the USB Host system 310 which may auto configure with an IP address and may provide access to various ports and resources for network activities. Upon activation, the OS may bind the Virtual Network Interface Controller 330, and the Application 340 may assume IP based network connections with other coupled USB Host systems, specifically using the Data Interface 174 in FIG. 1c for all Bulk Data exchanges with other coupled USB System hosts 310 including File Transfers to leverage the USB 3 5 Gps bandwidth enabling high speed data transfer in the range of 400-450 MBps.

In some embodiments, as illustrated by FIG. 3, USB Network interfacing may provide significant advantages for Host-to-Host implementations wherein Host systems may be in close proximity to one another, such as in office environments, library pods, and in Server rack installations.

The increased speed and bandwidth that may be realized by implementing a 5 Gbps USB Network, may be seen to improve the overall usage and capability over other commonly used and inexpensive networking solutions. In some aspects of the present application, concurrent use of existing network connections and the proposed USB Network is a means by which data transfers, data syncs, and daily backups can be provisioned more quickly, securely and efficiently.

Figure 4:
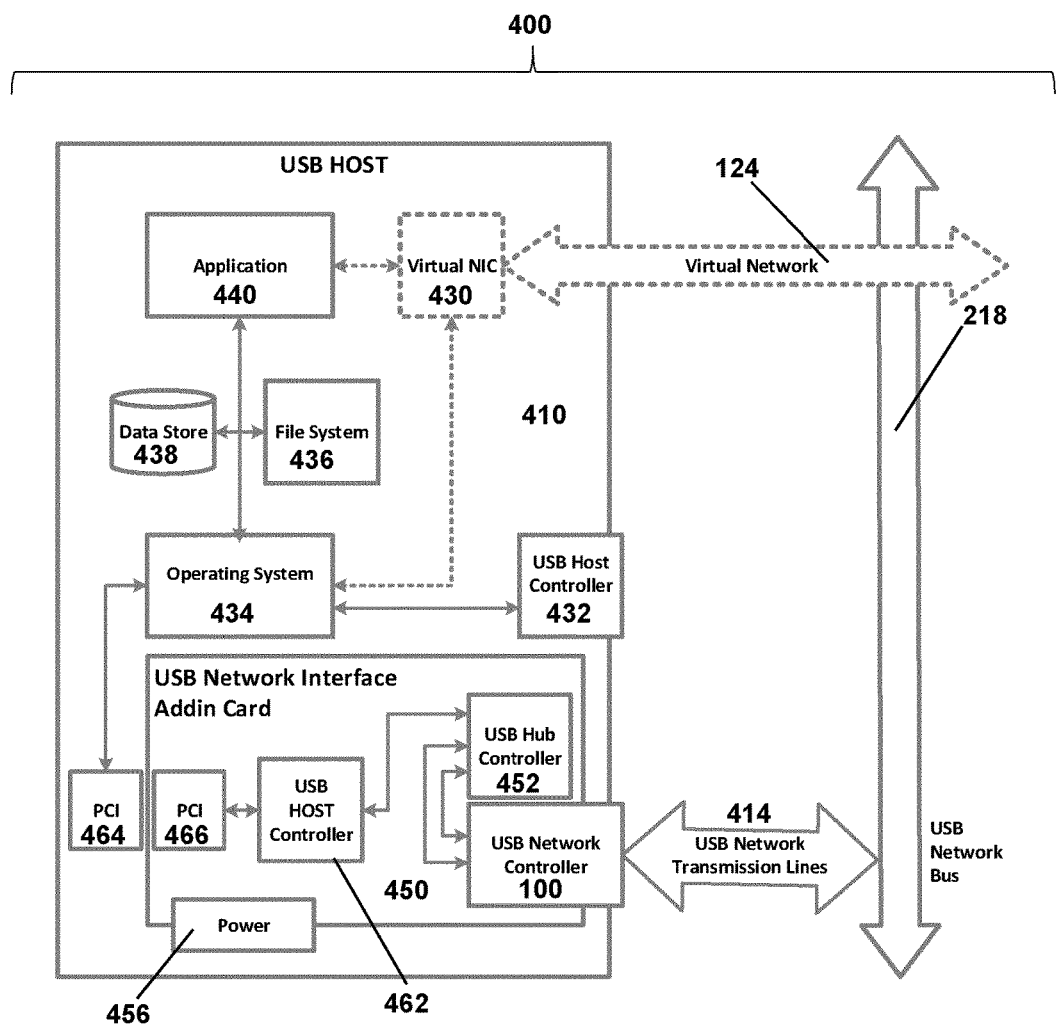
FIG. 4 illustrates a Link System as an alternative to the Link System of FIG. 2 and the Link System of FIG. 3 in accordance with aspects of the present application.

FIG. 4 illustrates a Link System 400 as an alternative to the Link System 200 of FIG. 2 and the Link System 300 of FIG. 3. In the Link System 400 of FIG. 4, a USB Network Interface add-in card 450 is illustrated as internally mounted in a USB Host system 410.

The USB Host system 410 has many of the same components as the USB Host system 210 of FIG. 2, including an Operating System 434; a File System 436; one or more Data Stores 438; an Application 440; a Virtual NIC 430 and a USB Host Controller 432.

The USB Network Interface add-in card 450 has many of the same components as the USB Network Interface 212 of FIG. 2. That is, the USB Network Interface add-in card 450 may include a USB Hub Controller 452 and a USB Network Controller 100 (like the USB Network Interface 212 of FIG. 2) and a Power port 456 (like the Power port 254 of FIG. 2). The USB Network Interface add-in card 450 may be implemented as a typical add-in peripheral card. Example typical add-in peripheral cards include: an adapter card; an expansion card; an add-in Ethernet Network Interface Card; and an externally attached dongle or device.

The USB Network Interface add-in card 350 has many of the same components as the USB Network Interface 212 of FIG. 2. That is, the USB Network Interface add-in card 350 may include a USB Hub Controller 452 and a USB Network Controller 100 (like the USB Network Interface 212 of FIG. 2) and a Power port 356 (like the Power port 254 of FIG. 2). The USB Network Interface add-in card 350 may be implemented as a typical add-in peripheral card. Example typical add-in peripheral cards include: an adapter card; an expansion card; an add-in Ethernet Network Interface Card; and an externally attached dongle or device.

The USB Network Interface add-in card 450 may have some components distinct from the USB Network Interface 212 of FIG. 2 and from the USB Network Interface Add-in Card 350 of FIG. 3, including a USB 3 Host Controller 462.

The USB Network Controller add-in card 450 may have a direct connection from the USB Host Controller 462 to the USB Network interface 454 by way of an internal connection of an onboard USB Transmission line, thereby eliminating an external USB Transmission Line to couple the USB Host 410 to the USB Network Interface 100 of the USB Network Controller add-in card 450.

The interface between the USB Network Interface add-in card 450 and the USB Host system 410 may be generically, for example, a Host Expansion or Peripheral bus. The Peripheral bus may, for example, be a local bus compliant with the Peripheral Component Interconnect (PCI) Local Bus standard or the PCI Express (PCIe) standard. To facilitate such an interface, the USB Host may include a PCI slot 464 and the USB Network Interface add-in card 450 may include a set 466 of PCI conductors.

Notably, the USB bus may be considered to be an extension of the known PCI bus and/or the known PCIe bus within a given Host system. It is common place for modern-day processors to expose the PCI/PCIe bus to the outside world by means of a protocol exchange, namely, a USB controller. The USB controller provides interconnection functionality with devices and other Hosts which are equipped with ubiquitous USB interfacing derived from their own exposed PCI/PCIe buses by means of compatible USB controllers. Such interfaces allow for high speed data transfer and or exchange over greater distances than that specified by the PCI/PCIe specification and at much lower cost than PCI/PCIe controller implementations. Also, new processor designs include USB buses direct to the CPU, thereby eliminating the need for an additional protocol exchange via an externally mounted controller. Embodiments of the invention claimed may include any "high-speed bus-related protocol" establishing Host to Device communications, and typically, but not necessarily, having a physical implementation employing differential pairs to deliver signals (data) at the hardware level; and are applicable protocols for use by aspects of the present application.

A USB Network Transmission line 414, which may be connected to the USB Network Controller 100, may connect the USB Network Interface add-in card 450 to the USB Network Bus 218.

As established, and in similar fashion as explained with regards to FIG. 3, connection and enumeration within the USB Host Controller 462 are handled according to USB specifications; and once connected and enumerated, the combination of the USB Host 410 and the embedded USB Network Controller add-in card 450 form the Link System 400.

Power for the Network Controller add-in card 450 may be provisioned, by way of the Power port 456, directly from an Expansion Bus of the USB Host 410 and may be managed internally by a Power Manager similar to the Power Manager 162 and or the Power Manager 192, which was described earlier, in conjunction with a review of the components of the USB Network Controller 100 of FIGS. 1a, 1b, and 1c. The physical interface from the USB Host system 410 to the USB Network 218 may be implemented through a USB Network Transmission Line 414 which, as described earlier, can be made of various buses and also interfaces virtually with the USB Host 410 by an established Virtual Network as described previously.

In some aspects of the present application, the Virtual NIC 430 may be established when coupling the USB Host system 410 to the USB Network 218. Once coupled, the USB Network Interface 114 of FIG. 1b is detected within the Application 440, and the OS 434, enumerates the I/O port and thereafter may enable the Virtual Network driver within the USB Host system 410 which may auto configure with an IP address and may provide access to various ports and resources for network activities. Upon activation, the OS may bind the Virtual Network Interface Controller 430, and the Application 440 may assume IP based network connections with other coupled USB Host systems, specifically using the Data Interface 174 in FIG. 1c for all Bulk Data exchanges with other coupled USB System hosts 410 including File Transfers to leverage the USB 3 5 Gps bandwidth enabling high speed data transfer in the range of 400-450 MBps.

Figure 5:
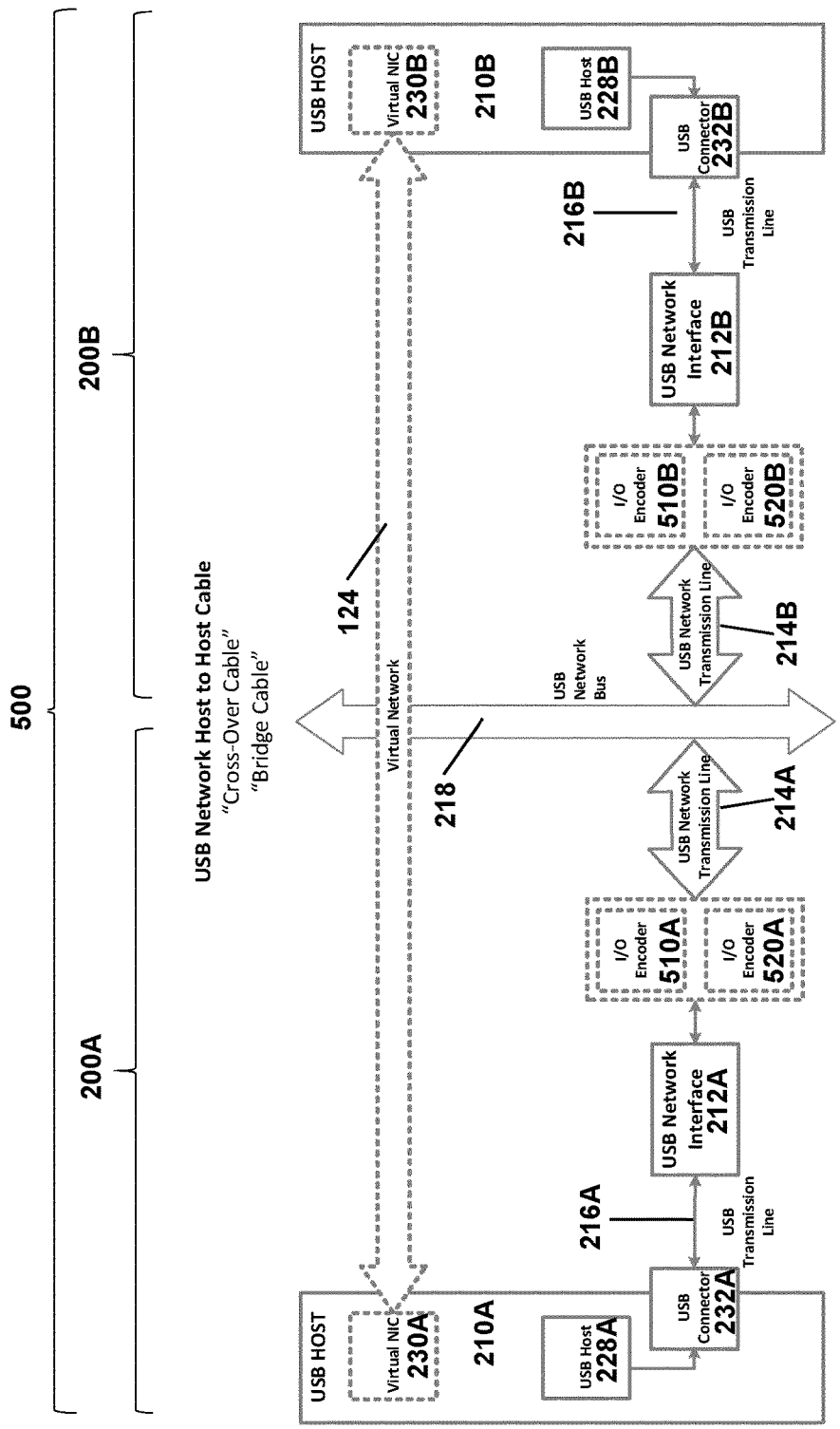
FIG. 5 illustrates a Link System featuring two coupled USB Host systems each with the USB Network Interface comprising a USB Network Controller of FIG. 1a similar to that illustrated in FIG. 2, in accordance with aspects of the present application.

FIG. 5 illustrates a Link System 500 featuring two Host systems, a first USB Host 210A and a second USB Host 210B, connected to each other by means of a Host-to-Host Cable implemented by deploying two USB Network Interfaces, a first USB Network Interface 212A and a second USB Network Interface 212B.

As previously outlined in FIG. 2, the first USB Host 210A includes various components for data and file transfer. The components may include: an Operating System 240A (not shown); a File System 236A (not shown); one or more Data Stores 238A (not shown); an Application 240A (not shown); a USB Host Controller 228A; a USB 3 Port 232A; and a Virtual NIC 230A. Similarly, the second USB Host 510B includes various components for data and file transfer. The components may include: an Operating System 240B (not shown); a File System 236B (not shown); one or more Data Stores 238B (not shown); an Application 240B (not shown); a USB Host Controller 228B; a USB 3 Port 232B; and a Virtual NIC 230B.

The first USB Network Interface 212A may, much like the components referenced earlier with respect to FIGS. 1 and 2, include a first USB Network Interface port 242A (not shown), a USB Hub Controller 244A (not shown), a USB Network Controller 100A (not shown), and a Power port 254A (not shown). Similarly, the second USB Network Interface 212B may include a second USB Network Interface port 242B (not shown), a USB Hub Controller 244B (not shown), a USB Network Controller 100B (not shown), and a Power port 254B (not shown).

In FIG. 5, a first USB Transmission line 216A connects a first host USB Port 232A of the first USB Host system 210A to the first USB Network Interface Port 242A (not shown) of the first USB Network Interface 212A. Similarly, a second USB Transmission line 216B connects a second host USB Port 232B of the second USB Host system 210B to the second USB Network Interface Port 210B (not shown) of the second USB Network Interface 212B.

A first USB Network Transmission line 214A, which may be connected to a first USB Network Controller 100A (not shown), may connect the first USB Network Interface 212A to a USB Network 218. Similarly, a USB Network Transmission line 214B, which may be connected to a first USB Network Controller 100B (not shown), and may connect the second USB Network Interface 212B to the USB Network 218.

In the first USB Network Interface 212A, an External Power connection may be provided by way of the first Power port 254A (not shown). Similarly, in the second USB Network Interface 212B, an External Power connection may be provided by way of the second Power port 254B (not shown).

As illustrated in FIG. 5, some embodiments relate to Host-to-Host connections for the purpose of deploying a Personal Area Network between Host systems of commercial, consumer and personal use such as Tablets, Laptops, Desktop Computers, and other smart devices including Smart phones and personal media players. In such an embodiment, the "bridge cable" use and operation resembles that of a ubiquitous USB2 Data Sync cable or an Easy Transfer Cable in which two host systems are coupled via a USB2-to-Ethernet converter bridged to the opposite side via another USB2-to-Ethernet converter, with relevance to an Ethernet cross-over cable; but enjoying the full transmission capacity available on the USB cable, unencumbered by Ethernet conversions, nor constrained by encapsulating USB transmissions within an Ethernet connection. This embodiment may be configured to allow remote control of the Host opposite, such that all resources, connections, interconnections, peripherals, devices, applications, and OS features and controls, are made available and usable with or without a security feature.

In some embodiments, the first USB Host 210A may be coupled to the second USB Host 210B via the Link System 500 by means of physical USB Network Bus 218, and a Virtual Network 124 being deployed upon enumeration of the first USB Network Interface 212A to the first USB Host 210A and the second USB Network Interface 212B to the second USB Host 210B. A closed loop deployment, the two USB Network Interfaces 212A, 212B are situated centrally and in opposition to one another, creating a USB Network architecture wherein USB connectivity may be provided to the USB Hosts 210A, 210B via the USB Transmission Lines 216A, 216B at either end of the Link System 500. Application software 240A, 240B (not shown) loaded and executed within respective USB Hosts 210A, 210B, using typical file management and utility software applications, and using common OS features, either located on or previously added to, respective USB Hosts 210A, 210B, may provide a means by which a user of either of the USB Hosts 210A, 210B, may move, copy, create, delete, and list the files (among other tasks and utilities) located on local and remote data stores 238A, 238B (not shown). In some embodiments, any system resource or capability residing in, or connected to, one USB Host system (for example USB Host system 210A) is also made available to the other USB Host system (for example USB Host system 210B.

In operation, links may be established through the Link System 500. These paths may be internal or external and may be physical or virtual. Conveniently, aspects of the present application may allow the Application 240A (not shown) and 240B (not shown), executed on the first USB Host system 210A, to connect and/or interface directly with or to any of the established links, be they internal or external, physical or virtual for which one or more coupled USB Host system (for example USB Host system 210B).

FIG. 5 also illustrates I/O encoders 510A, 520A, 510B and 520B may optionally be added as indicated, and may optionally be used in the operation of the apparatus. The I/O Encoders may be located within a device controller or without, and may encode raw data received by the device controller for transmission across the data bus, and may decode received data from across the bus for transmission to the device controller as raw data. As an example, the I/O encoder 520A may be located in between the USB I/O Device Controller #2A 170A and the USB Network Bus 218 for transmitting and receiving on the Data Bus 134A over the USB Network Bus 218 to the coupled Data Bus 134B; wherein the I/O encoder 520B located between USB Network Bus 218 and the USB I/O Device Controller #2B 170B having received the encoded data, may decode and send as raw data to USB I/O Device Controller #2B 170B. I/O encoders 510A and 510B may be located between USB I/O Controller #1A 110A and #1B 110B respectively.

Figure 6:
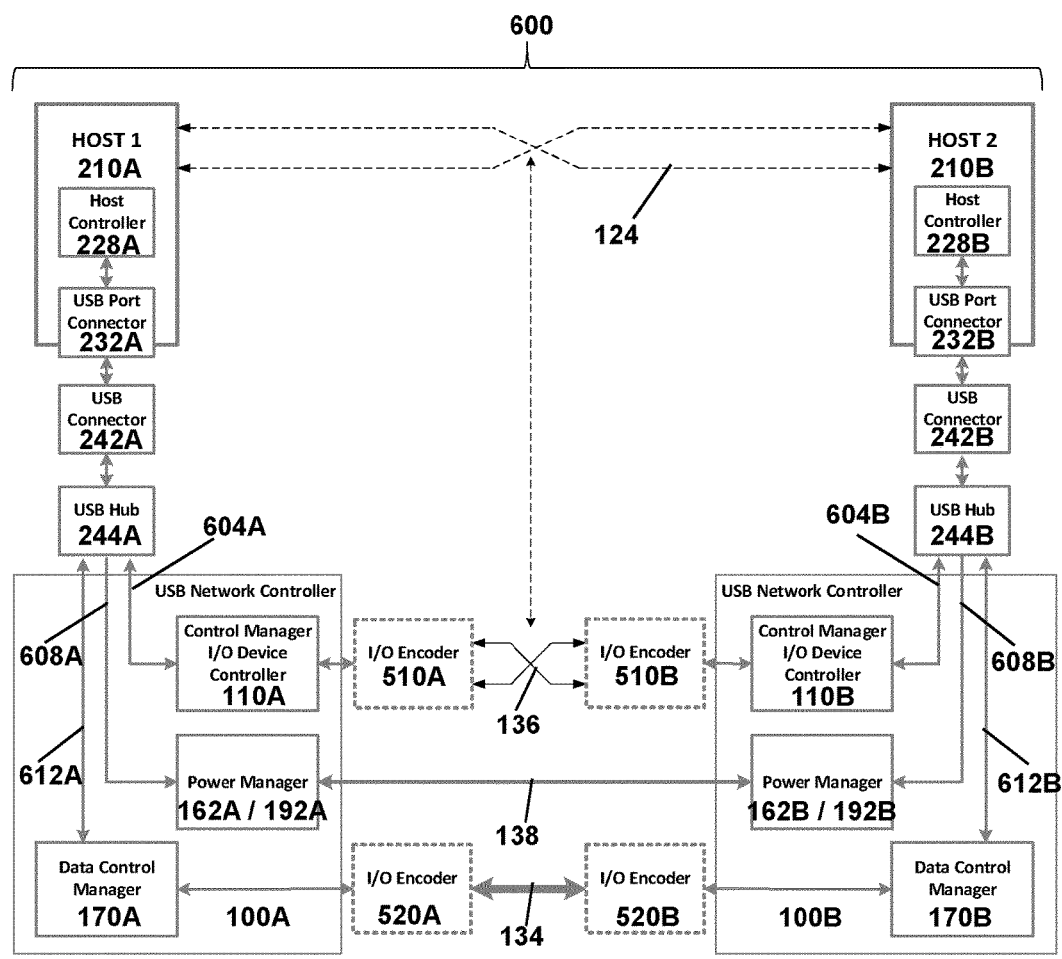
FIG. 6a illustrates a schematic of a further USB Link System, wherein there is a mirrored network interface implementation having multiple components common to each side in accordance with aspects of the present application.
FIG. 6b illustrates a schematic of the operational flow of a further USB Link System, wherein two USB Host systems couple and engage in a High Speed File Transfer process in accordance with aspects of the present application.
Figure 6:
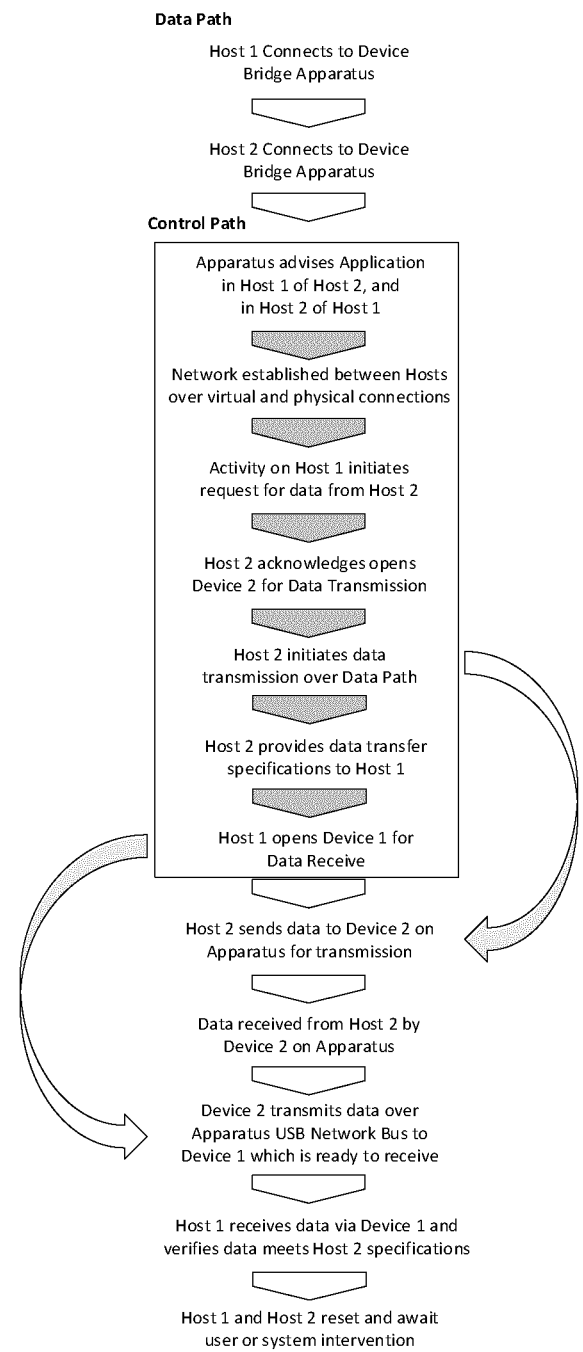

FIG. 6a illustrates a schematic of a further USB Link System 600, wherein there is a mirrored network interface implementation having multiple components common to each side, some of which have been described previously herein. As illustrated in FIG. 6a, a first USB Host system 210A may have a first USB 3 Host Controller 228A, and a first USB connector 232A, for example a USB 3 Type A Female connector physically coupled to a first USB mating connector 242A, for example a USB 3 Type A Male connector which may be connected to an embedded first USB 3 Hub Controller 244A; which may have two or more sets of differential pair transmission lines and may also have Power transmission lines, in which all transmission lines may be forming a connection from the first USB 3 Hub Controller 244A to the first USB 3 Network Controller 100A. A second USB Host system 210B may have a second USB 3 Host Controller 228B, and a second USB connector 232B, for example a USB 3 Type A Female connector physically coupled to a second USB mating connector 242B for example a USB 3 Type A Male connector which may be connected to an embedded second USB Hub Controller 244B; which may have two or more sets of differential pair transmission lines and may also have Power transmission lines, in which all transmission lines may be forming a connection from the second USB 3 Hub Controller 244B to the second USB 3 Network Controller 100B.

The first USB 3 Network Controller 100A may be connected to a second USB 3 Network Controller 100B via several USB Network Transmission Lines 214A (not shown) coupled to other several USB Network Transmission Lines 214B (not shown) forming a USB Network Bus 218 (not shown) illustrated as several independent segments coupling several independent process blocks and interfaces, 134, 136, 138, 124.

The first USB connector, for example a USB 3 Type A Male connector 626A may connect to a first USB 3 Hub Controller 606A via two or more sets of differential pair transmission lines and may also include Power transmission lines (not shown).

Similarly, the second USB connector, for example a USB 3 Type A Male connector 242B may connect to a second USB 3 Hub Controller 244B via two or more sets of differential pair transmission lines and may also include Power transmission lines (not shown).

The first USB 3 Hub Controller 244A may connect to a first Network and Control Management block 110A for example a USB I/O Device Controller #1, of the first USB 3 Network Controller 100A via two or more sets of differential pair transmission lines and may also include Power transmission lines 604A.

Similarly, the second USB 3 Hub Controller 244B may connect to a second Network and Control Management block 110B for example a USB I/O Device Controller #1, of the second USB 3 Network Controller 100B via two or more sets of differential pair transmission lines and may also include Power transmission lines 604B.

The first USB 3 Hub Controller 244A may also connect to a first Data Control Management block 170A for example a USB I/O Device Controller #2, of the first USB 3 Network Controller 100A via two or more sets of differential pair transmission lines and may also include Power transmission lines 612A.

Similarly, the second USB 3 Hub Controller 244B may also connect to a second Data Control Management block 170B for example a USB I/O Device Controller #2, of the second USB 3 Network Controller 100B via two or more sets of differential pair transmission lines and may also include Power transmission lines 612B.

The first USB 3 Hub Controller 244A may also connect to both the first USB I/O Device Controller #1 Power Manager 162A and to the first USB I/O Device Controller #2 Power Manager 192A via two or more sets Power transmission lines 608A.

Similarly, the second USB 3 Hub Controller 244B may also connect to both the second USB I/O Device Controller #1 Power Manager 162B and to the second USB I/O Device Controller #2 Power Manager 192B via two or more sets Power transmission lines 608B.

The first Network and Control Management block 110A may be coupled to the second Network and Control Management block 110B by a Network and Control Bus 136.

The first Power Management block 162A and 192A may be coupled to the second Power Management block 162B and 192B respectively, by a Power bus 138.

The first Data Control Management block 170A may be coupled to the second Data Control Management block 170B by a Data Bus 134.

In some aspects of the present application, as illustrated in FIG. 6a, I/O encoders 510A, 520A, 510B and 520B may optionally be added as indicated, and may optionally be used in the operation of the apparatus. The I/O Encoders, as previously described herein, may be located within a device controller or without, and may encode raw data received by the device controller for transmission across the data bus, and may decode received data from across the bus for transmission to the device controller as raw data.

Each of the first transmission lines 604A, 608A and 612A and each of the second transmission lines 604B, 608B and 612B may be implemented as, for example, copper traces on a circuit board or other embedded means within the Link System.

In operation, the various blocks 110A and 110B, 162A, 192A and 162B, 192B, and 170A and 170B in combination with the corresponding buses 136, 138 and 134 may be seen to form a USB Network which includes an established virtual network 124 having IP based addressing and using virtual Ports commonly associated with IP based networking. Physical network communications takes place over the Network and Control Buses 136 in which USB I/O Device Controllers on either Network Controller 100A and 100B communicate using a serial protocol. The protocol may be any of the industry standard and accepted serial communications protocol as interconnection of Transmit and Receive signaling may be a requirement. These commonly used protocol may include RS-232, RS-422, RS-485, SPI, I2C, CAN, etc. Physical Data exchange takes place over the Data Buses 134 in which USB 3 I/O Device Controllers #2 on either Network Controller 100A and 100B transact Bulk Data Transfer over selected SuperSpeed Endpoints. Transfer methods such as Bulk Data transfer, Asynchronous data transfer and Isochronous First-In-First-Out (FIFO) data transfer may be used for alternate forms of transfer such as continuous feed or Streaming Data. Different functions within an Application may be directed to different endpoints. Each endpoint may be selected on the basis of the suitability of the endpoint to perform a desired function. Similarly, data traffic may be directed to an endpoint that is suited to an identified data speed when coupling different versions of USB Hosts.

FIG. 6b illustrates a schematic of the operational flow of a further USB Link System, wherein two USB Host systems couple and engage in a High Speed File Transfer process in accordance with aspects of the present application.

The Data Transfer process requires that Host 1, may connect to the apparatus, and may have all supporting devices and components enumerated and may have established an IP address on the Virtual Network, may couple with Host 2, which also may require being connected to the apparatus, and may have all supporting devices and components enumerated and may have established an IP address on the Virtual Network. Host 1 and Host 2 may now be connected via the Virtual Network and exchange Network and Control Commands on the Physical Network and Control Bus. The primary interaction in the Data Transfer process is that Host 1 may query Host 2 for data listing such that the User receives information regarding the Files and their locations on Host 2. Once decided by the User, Host 1 may transmit via the Network and Control Bus endpoint a Send request to Host 2 such that a specific file, on Host 2, may be transferred. Host 2 may acknowledge and may create payload information and may send to Host 1. Payload details may include file name, byte count, and various security and checksum details. Host 2 may ready the Bulk Transfer Endpoint on the Data Bus and endpoint may enter standby mode in anticipation of the Request to Send condition set by Host 1. Host 1 may select a Bulk Transfer Endpoint and may establish the space needed for the incoming File. Host 1 may send to Host 2 a Request to Send on the Network and Control Bus. Host 2 may acknowledge the Request to Send command, and may engage the Bulk Transfer process to send the selected File to the expectant endpoint on Host 1 via the high speed Data Bus. Upon completion, Host 2 may close the Data Bus endpoints and may reset back to normal operation. Host 1 may upon completion of the Data Transfer, close the Data Bus endpoint and may assess the payload against the payload information previously acquired, for payload completeness, integrity and security. This process may continue to repeat itself should the User select numerous files or entire folders or entire Drive contents.

Figure 7:
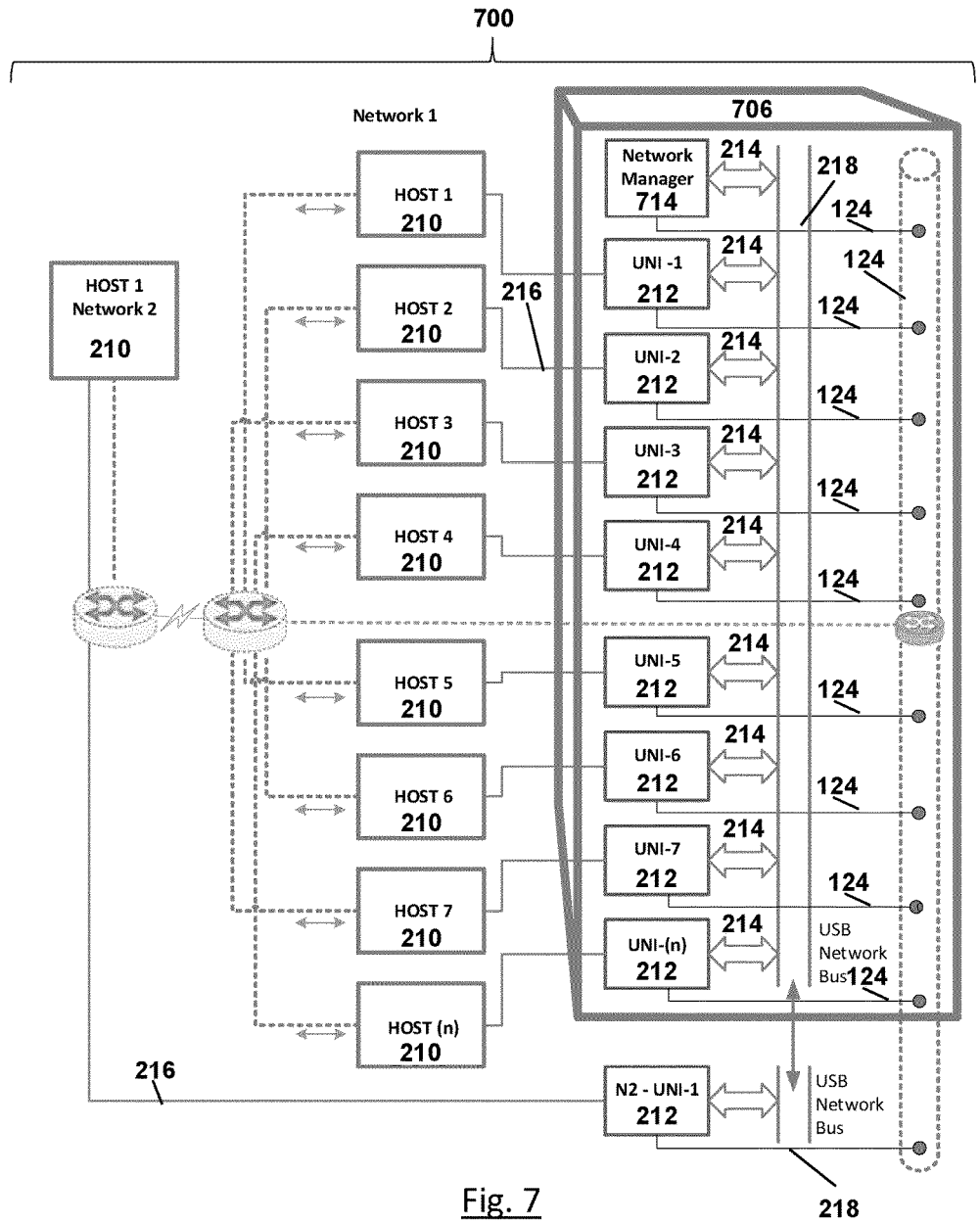
FIG. 7 illustrates a Link System featuring a plurality of Host Systems in accordance with aspects of the present application.

FIG. 7 illustrates a Link System 700 featuring a plurality of USB Host Systems 210. Each USB Host system 210 of the plurality of USB Host Systems 210 may be connected, via a respective USB Transmission Line 216, to a USB Network Switch 706. The USB Network Switch 706 may also be called a USB Network Router or a USB Network Bridge. At the USB Network Switch 706, each of the USB Transmission Lines 216 may be received at a respective plurality of USB ports (not shown). Within the USB Network Switch 706, a shared USB Network Bus 218 may be found. A plurality of USB Network Interfaces 212 may connect to the shared USB Network Bus 218 via bi-directional USB Network Transmission Lines 214. Furthermore, each of the plurality of USB Network Interfaces 212 may connect to a respective one of the USB ports 242 (not shown).

Conveniently, the USB Network Transmission Lines 718 are located internal to the USB Network Switch 706.

The USB Network Switch 706 may include a Network Manager Interface 714 connected to the shared USB Network Bus 218.

The USB Network Bus 218 may be seen to establish a central data and file transfer distribution center for the plurality of USB Host systems 210, as is the case for most modern-day computer-based network systems such as, for example, Ethernet Switches, Bridges and Routers. Since, the USB Network Bus 218 is internal to the USB Network Switch 706, it follows that the Network and Control Bus and the Power Bus are internal to the USB Network Switch 706. Accordingly, only the USB ports 242 (not shown) are exposed for coupling with the USB Host systems 210.

In operation according to some aspects of the present application, the Network Manager Interface 714 may provide enhanced and additional control at the Console level for internal system configuration, security, diagnostics, and administrative control. The Network Manager Interface 714 may, additionally, be used to offset, or to supplement, the Network and Control Management of any or all of the USB Network Interfaces 212. Interaction with the internally located USB Network Interfaces 212 may be carried out through physical network pathways or virtual network pathways. Furthermore, a given one of the USB Host systems 210 may facilitate communications with the Network Manager Interface 714 based on administration, configuration and security settings and parameters, using a Network Manager Console application (not shown) on the given one of the USB Host systems 210.

In some aspects of the present application, as illustrated in FIG. 7, the number of USB Network Interfaces 212 is not limited by USB specification or conventions, nor by other network architecture restrictions or limitations. Indeed, theoretically, an unlimited number of USB Network Interfaces 212 may be coupled or interconnected, either directly or through interconnections of differing topologies, wherein concatenation of two or more USB Network Switches 706 is possible. As mentioned hereinbefore, the USB Network Switches 706 may also be known as Bridges and/or Routers.

In operation, through the coupling of the physical network components, including the USB Host systems 210, the USB Transmission Lines 216, the USB ports 242 (not shown), the USB Network Transmission Lines 214 and the USB Network Bus 218, a Virtual Network 124 may be seen to have been established. Notably, the specified Network Switches, Bridges, and/or Routers can be provisioned and/or located internally or externally and in either, or both a physical or virtual presence. Also, the actual location of any Network Switch, Bridge or Router is not to be understood as being only positioned as depicted in FIG. 7, but can be located anywhere it is deemed to be necessary.

It can be said that in accordance with the description of the elements and components described earlier herein with respect to FIG. 2, similar elements having similar functionality in FIG. 7 may be established as being interchangeable.

In some aspects of the present application, as illustrated in FIG. 7, a USB Host system 210 having interconnection with the Virtual Network 124 through interconnection of Virtual Router or Bridge, may optionally be used as a Network Manager and have Remote access capabilities with the Network Manager 714 or with any coupled USB Host system 210 should the system be configured in such a manner to provide this type of access and usage.

Figure 8:
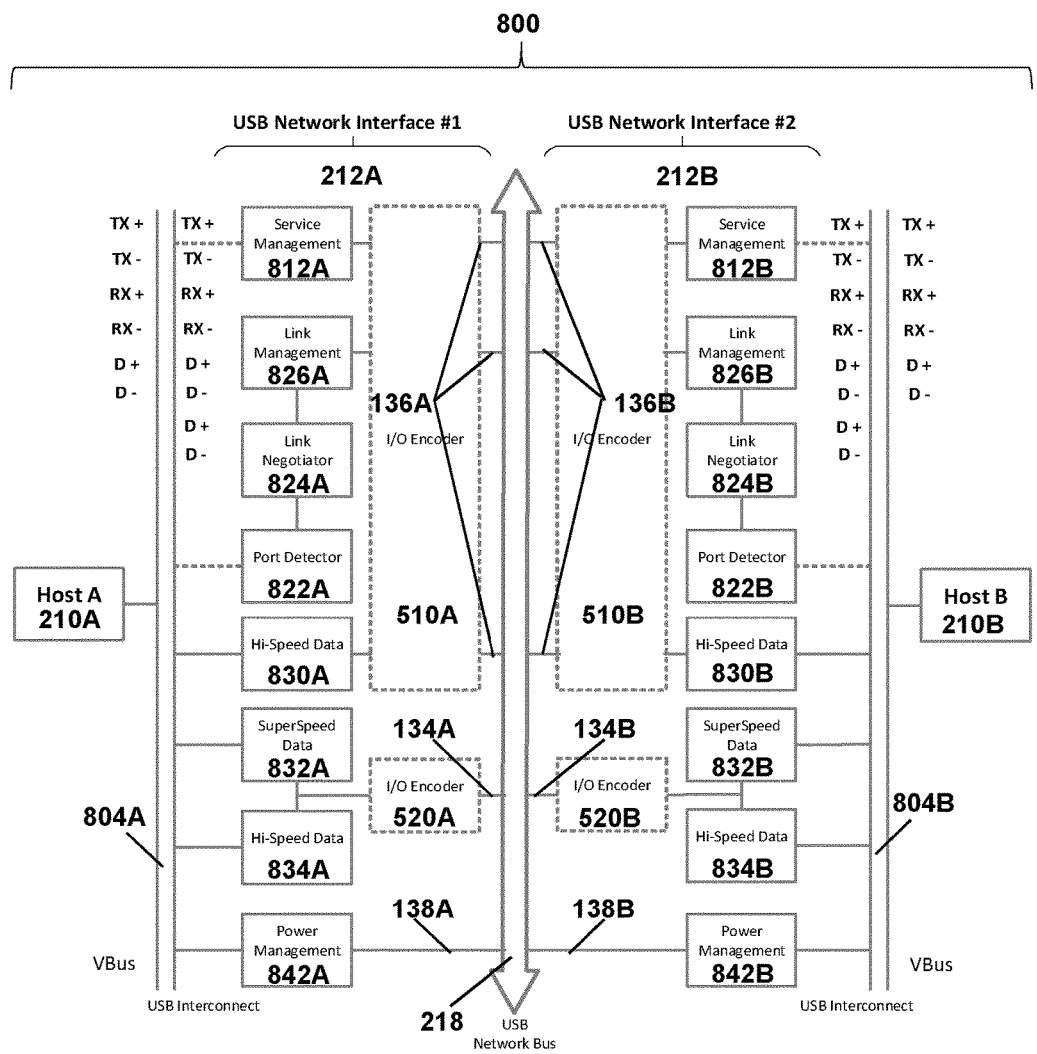
FIG. 8 illustrates, in schematic form, a Link System featuring a number of support elements that form a pair of USB Network Interfaces for coupling a first USB Host system to a second USB Host system in accordance with aspects of the present application.

FIG. 8 illustrates, in schematic form, a Link System 800 featuring a number of support elements included in each of a pair of USB Network Interfaces 212A and 212B for coupling a first USB Host system 210A to a second USB Host system 210B. The FIG. 8, in the configuration shown is not inclusive of some of the components that are either being referred to and states as not shown, or are not indicated as their functionality although pertinent to the overall function of the Link System is not included in the scope of this particular description of this or other similar embodiments, including USB 3 Hub Controllers, USB Connectors, and optional I/O encoders, etc.

The first USB Host System 210A may be coupled, via a first USB Network Interface 212A, to the second USB Host system 210B via a second USB Network Interface 212B. The USB Network interface 212A and 212B has been described previously herein as it pertains to FIG. 2. The first USB Host system 210A and the second USB Host system 210B, have also been described previously herein pertaining to FIG. 2, and are not shown in FIG. 8 but are understood to be connected via the first USB Interconnect 804A and a second USB Interconnect 804B, respectfully. The USB Host systems 210A and 210B (not shown) may each comprise a USB Host Controller; a USB Connector and a USB Transmission Line, described earlier herein, inclusive of several differential pairs and or multi-pairs and related Power conductors.

The first USB Network Interface 212A may include a first Power Management unit 842A. The second USB Network Interface 212B may include a second Power Management unit 842B. Both Power Management units 842A and 842B may be comprised of the Power Interfaces 116 and 176 of each of the USB I/O Device Controller #1 and #2 within the USB Network Controller 100 as previously referenced herein. The first Power Management unit 842A may be connected to the second Power Management unit 842B via a Power Bus Link 138A and 138B within the USB Network Bus 218, in accordance with the controls and commands issued from and through the Application 240 (not shown) on any of the coupled USB Host systems.

The first USB Network Interface 212A may include a first USB Differential Connection in which a first USB2 endpoint 834A and a first USB 3 endpoint 832A may be established. The second USB Network Interface 212B may include a second USB Differential Connection in which a second USB2 endpoint 834B and a first USB 3 endpoint 832B may be established. The first endpoints 832A, 834A may be made to communicate with the second endpoints 832B, 834B respectively via a Data Bus Link 134A and 134B within the USB Network Bus 218.

The first USB Network Interface 212A may further include a first Port Detector 822A which may connect to a first Link Negotiator 824A, which may be connected to a first Link Manager 826A. Similarly, the second USB Network Interface 212B may further include a second Port Detector 822B which may connect to a second Link Negotiator 824B, which may connect to a second Link Manager 826B. Port Detector 822A and 822B and Link Negotiator 824A and 824B may be directed by the user Application 240 (not shown) and USB Host System OS 234 (not shown) as required.

Furthermore, a first USB Network Interface 212A may include a first Service Management Block 812A and the second USB Network Interface 212B may include a second Service Management Block 812B. The first Service Management Block 812A and the second Service Management Block 812B may communicate via Service Bus Links 810A and 810B respectively as each are segments of the Network and Control Bus 136A and 136B respectively, and may be directed by the user Application 240 (not shown) and USB Host System OS 234 (not shown) as required.

The coupled Service Bus Links 136A and 136B may also be used when the first Service Management Block 812A and the second Service Management Block 812B communicate directly. Furthermore, the first Service Management Block 812A and the second Service Management Block 812B may employ an Addressing facility and may be directed by the user Application 240 (not shown) and USB Host System OS 234 (not shown) as required.

FIG. 8 illustrates an embodiment of the present application wherein the function of the Power Management units 842A, 842B may provision and monitor power requirements of the apparatus for optimal operation with respect to use of the fastest bus; and according to various factors, including, but not limited to, the distance from a connecting USB Host System, and the capacity relating to the USB Host System Bus power capacity when executing data transfer operations. Power may be derived, primarily, from a USB Host system through the appropriate USB Interconnect 804A, 804B. Within one or more embodiments, additional power may be provided via internal or external power courses, applied or connected via additional Power interconnects such as, as an example, and external Power adapter. Alternatively, external power sources may be applied or connected via any other coupled USB Host system on the Power Bus 138A and 138B, providing the other coupled USB Host system has sufficient regulated power and capacity. Furthermore, Power Management units 842A, 842B may be directed by the user Application 240 (not shown) and USB Host System OS 234 (not shown) as required.

In operation of the Link System 800 of FIG. 8, data may be passed between USB Host systems 210A and 210 Busing be of either the USB 2 endpoints 834A, 834B or the USB 3 endpoints 832A, 832B. In either case, the data may be directed by a Data Control Manager to a Data Exchange unit, such as found as the Data Control Manager 172 (not shown) and the Data Exchange unit 194 in the USB Network Controller 100 of FIG. 1*a* and of the USB I/O Device Controller #2 in FIG. 1*c*. Additionally, the data may be reformatted and prepared for transfer to the Data Bus 134A and 134B. A Data Control Manager, such as the Data Control Manager (not shown) in the USB Network Controller 100 of FIG. 1*a* and of the USB I/O Device Controller #2 in FIG. 1*c*, may provide an open path and directives to each USB Host system to engage the transfer process. In some aspects of the present application, the Data Exchange unit 194 (not shown) may accommodate same and mixed transfers of any combination of USB 2 and USB 3 originating data and speeds. Optionally, Data I/O encoders (/decoders) 510A, 510B, and 520A and 520B as described previously herein with respect to FIG. 5, may be provisioned within this embodiment as well.

FIG. 8 does not show a Network and Control Manager 112 (not shown). However, in consideration of the Network and Control Manager 112 of the USB Network Controller 100 of FIGS. 1*a* and 1*b*, one may consider that, in operation of the Link System 800 of FIG. 8, a Network and Control Manager 112 (not shown) synchronize, coordinate physical interconnections, and Virtual interconnections, between the coupled USB Host systems.

The Network and Control Manager 112 (not shown) may defer control to the Application 240 (not shown) and OS 234 (not shown). Indeed, the Network and Control Manager 112 (not shown) may attend, primarily, to lower level functions concerning detection and negotiation of the connected USB endpoints and implementing address determination and selection protocols along with data direction and flow control for the coupled USB Host systems 210A and 210B.

In operation, the first Port Detector 822A may sense the USB connection type. Accordingly, the first Port Detector 822A may permit or decline the connection as per Driver and Operating System 240A (not shown) instructions from one or more connected USB Host systems. If a connection is permitted, the first Link Negotiator 824A may establish a suitable physical and/or virtual reference for the connected USB Host system prior to being coupled with another USB Host system. The first Link Manager 826A, in turn, may establish an address on the first Address Bus Link 136A. The first Link Manager 826A may also inform the first Network and Control Manager 112 (not shown) of the pairing of physical and/or virtual addresses for the USB Host System 210A and 210B and the USB Network Interfaces 212A and 212B.

The first Service Management Blocks 812A and 812B may provide additional console-type connections for loading and upgrading code logic of the USB Network Interfaces 212A and 212B respectfully. The first Service Management Block 812A may also provide non-essential services, including control and switching of external reporting mechanisms for Process confirmations and/or acknowledgements of services. Exchange of such service to either side of the USB Network Bus 218 is provided for on the Service Bus Links 136A and 136B, and may be managed by the Network and Control Manager 112A (not shown) using logic executed by the first Link Manager 826A.

Process confirmations may include error, power, security and/or mode level indication and reporting. One example of a means to provide confirmation in a preferred embodiment comprises Light Emitting Diode signaling indicators using distinct colors to provide distinct indications or by on-off or dimming states.

Figure 9:
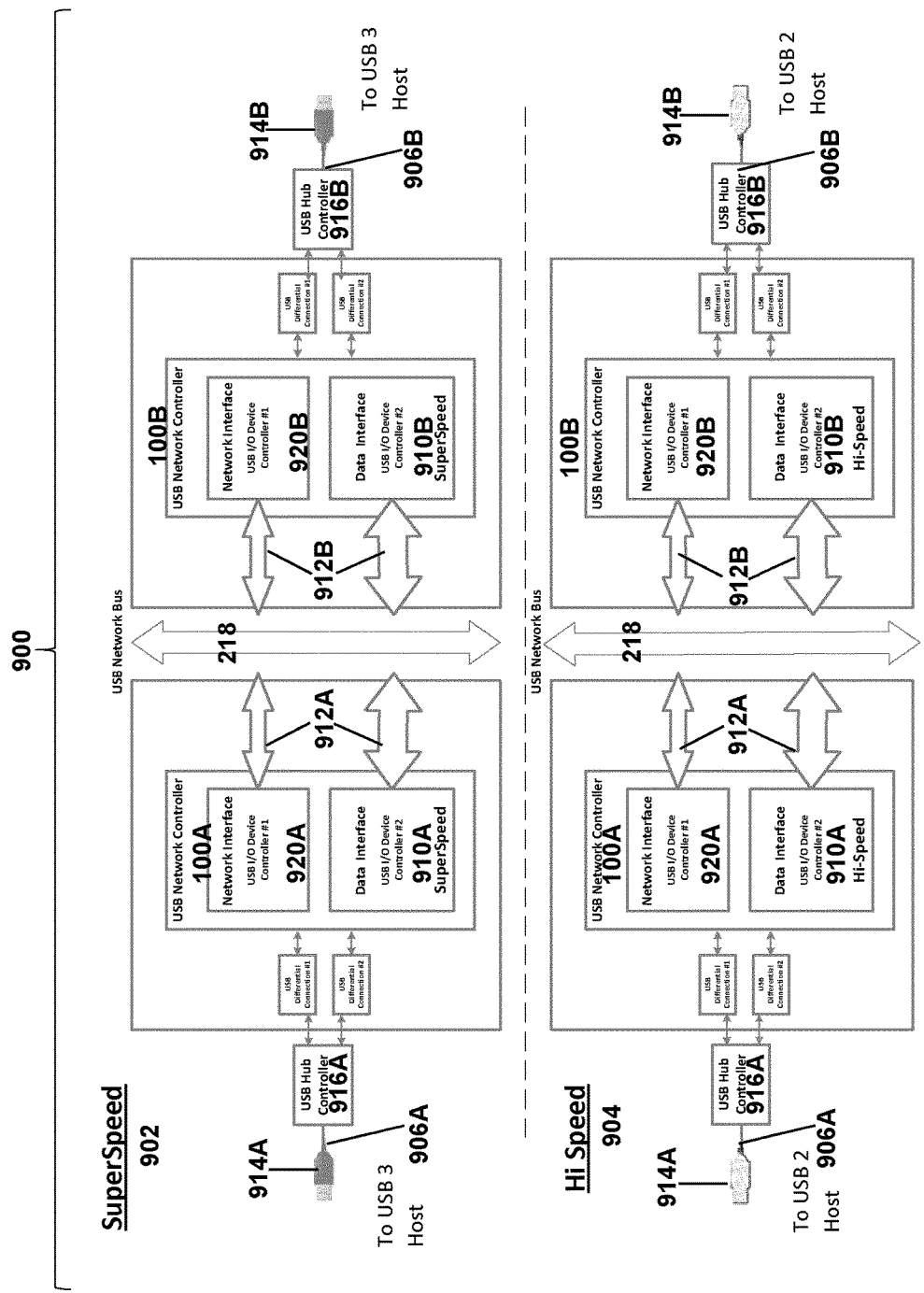
FIG. 9 illustrates, in schematic form, a Link System featuring two or more separate pathways for Data Transfer to and from a USB Network in accordance with aspects of the present application.

FIG. 9 illustrates, in schematic form, a Link System 900 featuring two or more separate links for a Data Link for Data and File Transfer and a Communication Link for Network and Control communications to and from a USB Network Bus 218. The Link System 900 of FIG. 9 includes a USB 3 SuperSpeed configuration 902 and an alternative USB 2 Hi-Speed configuration 904.

The USB 3 SuperSpeed configuration 902 includes a first USB I/O Device Controller #2 910A connected to the USB Network Bus 218 via a first plurality of USB Network Transmission Lines 912A. Additionally, the first USB I/O Device Controller #2 910A may be connected to a first USB 3 Hub Controller 916A terminating to a USB 3 Male Type A connector 914A via a first USB 3 Transmission Line 906A. The USB 3 SuperSpeed configuration 902 also includes a first USB I/O Device Controller #1 920A connected to the USB Network Bus 218 via the first plurality of USB Network Transmission Lines 912A and may be connected to a first USB 3 Hub Controller 916A also terminating to a USB 3 Male Type A connector 914A via the USB 3 Transmission Line 906A. The target USB Host system may have a USB 3 Host Controller and USB 3 external Ports available for which to connect this configuration of the described embodiment in a USB 3 SuperSpeed configuration.

The USB 3 SuperSpeed configuration 902 further includes a second USB I/O Device Controller #2 910B connected to the USB Network Bus 908 via a second plurality of USB Network Transmission Lines 912B. Additionally, the second USB I/O Device Controller #2 910B may be connected to a second USB 3 Hub Controller 916B and terminating to a USB 3 Male Type A connector 914B via a second USB 3 Transmission Line 906B. The USB 3 SuperSpeed configuration 902 also includes a second USB I/O Device Controller #1 920B connected to the USB Network Bus 908 via the second plurality USB Network Transmission Lines 912B and may be connected to second USB 3 Hub Controller 916B and terminating to a USB 3 Male Type A connector 914B via a second USB 3 Transmission Line 906B. The target USB Host system, may have a USB 3 Host Controller and USB 3 external Ports available to connect, completes this configuration of the described embodiment in a USB 3 SuperSpeed configuration.

The USB 2 Hi-Speed configuration 904 includes a first USB I/O Device Controller #2 910A in an alternative configuration connected to the USB Network Bus 218 via the first plurality of USB Network Transmission Lines 912A. Additionally, the first USB I/O Device Controller #2 910A in an alternative configuration may be connected to a first USB 3 Hub Controller 916A and terminating to a USB 3 Male Type A connector 914A via a first USB 3 Transmission Line 906A. The USB 2 Hi-Speed configuration 904 may also include a first USB I/O Device Controller #1 920A connected to a first USB 3 Hub Controller 916A also terminating to a USB 3 Male Type A connector 914A via the USB 3 Transmission Line 906A. The target USB Host system may have only USB 2 Host Controller and USB 2 external Ports available for which to connect this configuration of the described embodiment in a USB 2 Hi-Speed configuration.

The USB 2 Hi-Speed configuration 904 further includes a second USB I/O Device Controller #2 910B in an alternative configuration connected to the USB Network Bus 218 via the first plurality of USB Network Transmission Lines 912B. Additionally, the second USB I/O Device Controller #2 910B in an alternative configuration may be connected to a second USB 3 Hub Controller 916B and terminating to a USB 3 Male Type A connector 914B via a second USB 3 Transmission Line 906B. The USB 2 Hi-Speed configuration 904 may also include a second USB I/O Device Controller #1 920B connected to a second USB 3 Hub Controller 916B also terminating to a USB 3 Male Type A connector 914B via the USB 3 Transmission Line 906B. The target USB Host system may have only USB 2 Host Controller and USB 2 external Ports available for which to connect this configuration of the described embodiment in a USB 2 Hi-Speed configuration.

In the Link System 900, as illustrated in FIG. 9, when a USB 3 SuperSpeed interconnection is made to a USB Host system via the first USB 3 Transmission Line 906A and the first USB 3 Male Type A connector 914A, the first USB I/O Device Controller #2 910A may be configured to fulfill data and file transfers between, both to and from, the USB Network Bus 218 via the first USB Network Transmission Lines 912A.

In some aspects of the present application, when connected to a USB 3 SuperSpeed Host system, the Link System may assign all Host-side and intra-Link or network, system command and management data including node addressing, directional flow, flow control, security, configuration, sync and traffic management, messaging and critical assist and override functions and others, to the first USB I/O Device Controller #1 920A in a separate Communication Link parallel to the Data Link already established via the first USB I/O Device Controller #2 910A.

Conveniently, when separate dual and parallel Links are employed, it may be shown that relatively high data transfer rates may be achieved when connecting to USB 3 SuperSpeed Host systems. These relatively high data transfer rates may be attributed to an exchange of control data and network management data on paths that are separate and distinct from the path on which the data is exchanged.

In some aspects of the present application, both the first USB I/O Device Controller #2 910A and the first USB I/O Device Controller #1 920A may be deployed as Data Transfer pathways. In this manner, the bandwidth of the first USB I/O Device Controller #2 910A may be supplemented by channeling relatively smaller size transfers to a slower secondary pathway such as that formed by the first USB I/O Device Controller #1 920A. Additionally or alternatively, deploying this method, using both first USB I/O Device Controller #2 910A and USB I/O Device Controller #1 920A for Data and File Transfers may allow for simultaneous file transfers in opposite directions.

In the Link System 900, as illustrated in FIG. 9, when a USB 2 Hi-Speed interconnection is made to a USB Host system via the first USB 3 Transmission Line 906A and the first USB 3 Male Type A connector 914A, the first USB I/O Device Controller #2 910A may be configured to fulfill data and file transfers between, both to and from, the USB Network Bus 218 via the first USB Network Transmission Lines 912A.

In some aspects of the present application, when connected to a USB 2 Hi-Speed Host system, the Link System may assign all Host-side and intra-Link communications, for example network, system command and management data including node addressing, directional flow, flow control, security, configuration, sync and traffic management, messaging and critical assist and override functions and others, to the first USB I/O Device Controller #1 920A in a separate Communication Link parallel to the Data Link already established via the first USB I/O Device Controller #2 910A.

Conveniently, when separate dual and parallel Links are employed, it may be shown that relatively high data transfer rates may be achieved when connecting to USB 2 Hi-Speed Host systems. These relatively high data transfer rates may be attributed to an exchange of control data and network management data on paths that are separate and distinct from the path on which the data is exchanged.

In an example of the embodiment of the invention as a USB Link System, mode selection between USB 3 Super-Speed and USB 2 Hi-Speed may pertain to the version of the USB Protocol that is being used by the connected USB Host system at any given Endpoint, and may be controlled by a higher level Application on the USB Host system and by a Link System. The Code Logic within the Link System may provision capability for the Link System to select modes based on interconnect signal integrity and degradation level.

Some aspects of the present application may include a method, apparatus and system wherein two or more USB data paths may be established and used simultaneously, in any direction, and that the network and control path established between any and all coupled Host systems may be implemented as a shared resource and may accommodate shared control management.

Figure 10:
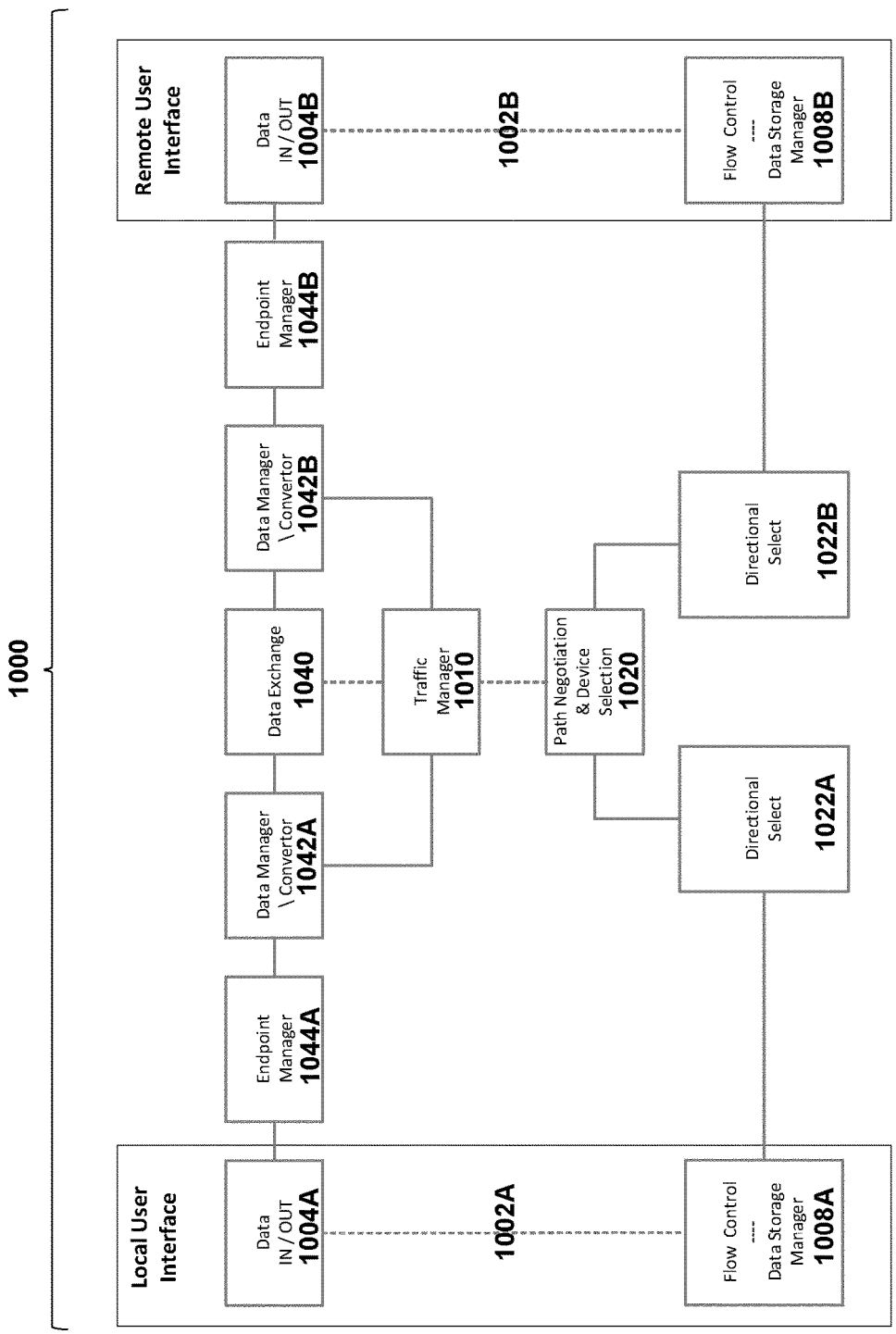
FIG. 10 illustrates, in schematic form, the elements and operation of an Application used in conjunction with a Link System featuring coupling between a first USB Host and a second USB Host in accordance with aspects of the present application.

FIG. 10 illustrates, in schematic form, the main components and or routine blocks and or Logic blocks of an Application program 1000 used to interact with the Link Systems outlined and described previously herein, featuring coupling between a first USB Host System 210A (not shown) and a second USB Host 210B (not shown) as per FIG. 2 and FIG. 5.

The Application may host navigation and execution commands provided by interaction with both the USB Host system and or the User input in operation of the Link System and coupled USB Host systems. Application software involving user interaction at the local level and or at a network level, may include a User Interface to provide a means to navigate and execute pre-programmed processes or routines, involving simplistic processes or gestures, such that Data may be transferred from one coupled USB Host system to another, amongst other desirable transactions. The Local User Interface 1002, refers to that User Interface (hereinafter "UI") pertaining to the USB Host system on which the Application may be running and for which there may be a User interacting with the Application in real time and in real session. The UI may include a Data In/Out 1004A data transfer facility or process unit as that which may be exposed to the User as both a reporting facility and an input facility. The UI may also include Flow Control facility and a Data Storage Manager 1008A. The Flow Control facility may provide access to viewing and selecting USB Host system Hardware Panels for monitoring and selecting Protocol based Endpoints, Ports, Addresses, and Data Handling features. The Data Storage Manager facility may provide File and Folder monitoring and maintenance functions, more commonly known as File Explorer functions whereby Data Storage devices are listed, and may be selected for retrieving storage capacity and for listing stored contents in folder and file formats as defined by the OS.

The Application program pertaining to the Link System 1000 of FIG. 10 may include a Traffic Manager 1010. The Traffic Manager 1010 is central to the Application in that all data traversing the USB Network Bus 218 (not shown) to and from the coupled USB Host systems, may be required that such traversals induce data traffic on all buses as previously described herein. For data transversal to be successfully accomplished, an ability to manage timing and path selection, and deselection, may be required.

In similar functional positioning as that of the Traffic Manager 1010, the Data Exchange 1040 process and the Negotiate Path and Device Selection 1020 routines may be the only processes or routines that directly transact across, or traverse, the USB Network Bus 218 (not shown) as Local and Remote references may be considered directional indicators and may not have logical demarcations. That is to say that logic in any of the three routine blocks may be considered as both a logical endpoints of the opposing data and command structures, and as a logical start point to any function or routine in reaction to the opposing endpoints.

The Data Exchange 1040 process may interact directly with the Link System's USB I/O Device Controllers #1 and #2 as previously described herein. Data within those Memory Blocks 152 and 182 may traverse the USB Network Bus under the instruction and direction of the Data Exchange process.

The Negotiate Path and Device Selection 1020 routines may also interact directly with the Link System's USB I/O Device Controllers #1 and #2 as previously described herein. Selections made by the user and or the Application may translate into openings or closings of specific ports on the USB Host systems and may include direct communications with the USB Network Controller 100 as described earlier herein.

An Endpoint Manager 1044A routine may be used to determine the necessary endpoint to target for incoming and outgoing data exchanges as per the desired user action or in logical reaction to queries from the opposite coupled USB Host system Application. Logical control sequences are established by the Traffic Manager 1010 based on endpoint selection determined by the Local Endpoint Manager 1044A and in synchronization with the Remote Endpoint Manager 1044B.

The Data Manager/Converter 1042 routine may establish the format and exchange information of the sending or receiving payloads such that payload bits are both counted, aligned, and packaged for transport in either direction based on the engagement and determination by the Traffic Manager 1010 and respective Endpoint Managers 1044A and 1044B. The Local Data Manger/Converter 1042A may interact with the Remote Data Manager/Converter 1042B through interaction with the Traffic Manager 1010 Process Logic.

Both the Local Direction Select 1022A and its counterpart the Remote Direction Select routines may report and react to logic selections processed by the User input from the Local UI 1002A or the Remote UI 1002B, utility if engaged by the user, that may cause or require change to the Flow Control and Data Storage Manager 1008A and 1008B processes respectively, and confirmation of Data direction flow and Network Control sequences or routines may be synchronized by the Traffic Manager 1010, and subsequently may be reported or confirmed by the Application to both the engaged logic processes and the Local UI 1002A and or the Remote UI 1002B, if engaged.

In operation of the Link System 1000 of FIG. 10, an application executing on the first USB Host system 210A (not shown) may detect, sense, negotiate and direct data transfers, Network commands, Control command, and Link System commands to facilitate and synchronize device addressing and data flow through appropriate links. Data flow through the first USB Host system 210A (not shown) may involve a device driver exposing available endpoints for data transmission and available endpoints for network interconnects.

The available endpoints identified may vary depending on the type of data transfer via USB protocol to coincide with the desired service mode of the USB Network Interface 212A and 212B (not shown). Example types of data transfer include Bulk data transfer, Asynchronous data transfer and Isochronous First-In-First-Out (FIFO) data transfer. Different functions within the Application may be directed to different endpoints. Each endpoint may be selected on the basis of the suitability of the endpoint to perform a desired function. Similarly, data traffic may be directed to an endpoint that is suited to an identified data speed when coupling different versions of USB Hosts.

The Local Endpoint Manager 1044A may enable selection of, and switching to, various endpoints to meet requirements specified by an Application. The Local Endpoint Manager 1044A may also enable, engage or require the Local Data In/Out Transfer process 1004A of the Local USB Host system 210A (not shown).

The Local Data Manager 1042A may be engaged by an Application via requisite declaration of required space, file name(s), directory, file type(s) and supplemental processes, such as byte count, checksum, and others. Direct communication between the Local Data Manager 1042A and the Traffic Manager 1010 may assist to allow for relatively accurate data transfers and relatively higher levels of security. In this way, data transfers may be seen as highly efficient and a reduction may be realized in collisions and transfer resends.

In operation, activities at the Data Exchange 1040 may align to the needs of the Traffic Manager 1010 to support various modes of operation to allow for relatively high data transfer speed, relatively high bandwidth, relatively high security and relatively high data integrity for the attached or coupled USB Host systems 210A and 210B (not shown) respectively.

In operation, the Traffic Manager 1010 may seek information for link or pathway determination for efficient data transfer. Devices, device endpoints and data paths may be taken into account with respect to Data Flow direction, network and control messaging, and process reporting to an Application and to a USB Network Interface.

Also in operation, the Negotiate Path and Device Selection Unit 1020 may execute logic when such information for link or pathway determination is sought by the Traffic Manager 1010 or when triggered by the Local and or Remote Direction Select 1022A and 1022B processes respectfully, and or by the Local and or Remote Flow Control and Data Storage Manager 1008A and 1008B processes respectively.

The Local Direction Select 1022A and the Local Flow Control and Data Storage Manager 1008A may execute processes within a Local USB Network Interface 212A in conjunction with an Application's requirements and events that may be triggered by the Local USB Host system 210A (not shown) and Link System 1000 logic. The Local Operating System 234A (not shown) and a Local Application 240A (not shown) may execute at the Local USB Host system 210A (not shown) and may interact to indicate requirements to the Local Flow Control and Data Storage Manager 1008A accessed via the Application 240A and Local device drivers, such that each communicates directly with the Local USB Network Interface 212A (not shown) logic in collaboration with the Remote USB Network Interface 212B (not shown) logic across the Network and Control Management Bus 136A and 136B (not shown) respectfully. The same could be said with respect to processes triggered or executed on both the Local and or the Remote sides or counterparts of those referenced above.

The invention claimed is:

1. A system for transferring data between a first host computer and a second host computer comprising:
   a first host computer capable of independently sending and receiving data and control information;
   a second host computer capable of independently sending and receiving data and control information;
   a first network interface controller comprising at least two input/output (I/O) device controllers and a means for receiving power to the first network interface controller, wherein each I/O device controller of the first network interface controller is communicatively coupled to the first host computer, and wherein a first of the at least two I/O device controllers is communicatively coupled to a shared control bus and a second of the at least two I/O device controllers is communicatively coupled to a shared data bus; and
   a second network interface controller comprising at least two I/O device controllers and a means for receiving power to the second network interface controller, wherein each I/O device controller is communicatively coupled to the second host computer, and wherein a first of the at least two I/O device controllers is communicatively coupled to the shared control bus and a second of the at least two I/O device controllers is communicatively coupled to the shared data bus;
   wherein the first network interface controller and the second network interface controller interconnect the first host computer and the second host computer to the shared control bus and the shared data bus to thereby establish a network path between the first host computer and the second host computer; and
   wherein data exchanges with the shared control and data buses may be coordinated by independent host computers to effect a network.

2. The system of claim 1, wherein the first host computer and the second host computer each comprise installed software which when executed establishes the network between the first host computer and the second host computer and provides for the transfer of data and control information over the network.

3. The system of claim 2, wherein the installed software when executed establishes a control link over a control path and a data link over a data path.

4. The system of claim 3, wherein the installed software when executed establishes one or more further control links for security, software updates or other administrative capabilities.

5. The system of claim 3, wherein the installed software further comprises a network and control manager adapted to create a temporary interconnection between the first host computer and the second host computer and to establish addressing and a data manager adapted to transact data and file transfers between the first host computer and the second host computer.

6. The system of claim 1, further comprising an I/O encoder in at least one of the first and second network interface controllers for encoding raw data received by the I/O device controller communicatively coupled to the shared data bus for transmission across the shared data bus.

7. The system of claim 1, wherein the communicative coupling between the first network interface controller and the first host computer is adapted for the communication of differential signals.

8. The system of claim 1, wherein the communicative coupling between the first network interface controller and the first host computer includes a hub.

9. The system of claim 1, wherein the communicative coupling between the first network interface controller and the first host computer includes, over a single connection to the first host computer, a first electronic path from the first of the at least two I/O device controllers and a second electronic path from the second of the at least two I/O device controllers.

10. The system of claim 1, further comprising:
one or more further host computers each capable of independently sending and receiving data and control information;
one or more further network interface controllers each comprising at least two I/O device controllers and a means for receiving power to the third network interface controller, wherein each I/O device controller of the one or more further network interface controllers is communicatively coupled to one of the one or more further host computers, and wherein a first of the at least two I/O device controllers is communicatively coupled to the shared control bus and a second of the at least two I/O device controllers is communicatively coupled to the shared data bus;
wherein the first network interface controller, the second network interface controller and the one or more further network interface controllers interconnect the first host computer, the second host computer and the one or more further host computers across the shared control bus and the shared data bus to thereby support the creation of a network between the first host computer, the second host computer and the one or more further host computers.

11. The system of claim 10, wherein the network is in a mesh, star, ring or bus network configuration.

12. A link system apparatus for transferring data between a first host computer and a second host computer comprising:
a first network interface controller comprising at least two input/output (I/O) device controllers and a means for receiving power to the first network interface controller, wherein each I/O device controller of the first network interface controller is communicatively coupled to a differential pair connection or an optical connection, and wherein a first of the at least two I/O device controllers is communicatively coupled to a shared control bus and a second of the at least two I/O device controllers is communicatively coupled to a shared data bus; and
a second network interface controller comprising at least two I/O device controllers a means for receiving power to the second network interface controller, wherein each I/O device controller is communicatively coupled to a differential pair connection or an optical connection, and wherein a first of the at least two I/O device controllers is communicatively coupled to the shared control bus and a second of the at least two I/O device controllers is communicatively coupled to the shared data bus;
wherein the first network interface controller communicatively couples to the first host computer and the second network interface controller communicatively couples to the second host computer and the link system apparatus interconnects the first host computer and the second host computer across the shared control bus and the shared data bus to thereby establish a network between the first host computer and the second host computer, wherein each of the first host computer and second host computer is capable of independently sending and receiving data and control information.

13. The link system apparatus of claim 12, further comprising an I/O encoder in at least one of the first and second network interface controllers for encoding raw data received by the I/O device controller communicatively coupled to the shared data bus for transmission across the shared data bus.

14. The link system apparatus of claim 12, wherein the communicative coupling between the first network interface controller and the first host computer includes a hub.

15. The link system apparatus of claim 12, wherein each of the first and second network interface controllers further comprises a wireless transceiver and a wireless device controller.

16. A method for transferring data between a first host computer and a second host computer comprising:
communicatively coupling a first input/output (I/O) device controller and a second I/O device controller to a first host computer, wherein the first host computer is capable of independently sending and receiving data and control information;
communicatively coupling a third I/O device controller and a fourth I/O device controller to a second host computer, wherein the second host computer is capable of independently sending and receiving data and control information;
establishing a control link between the first I/O device controller and the third I/O device controller;
establishing a data link between the second I/O device controller and the fourth I/O device controller; and
transferring data from the first host computer to the second host computer by communicating the data to the second I/O device controller and then over the data link to the fourth I/O device controller and then to the second host computer.

17. The method of claim 16, wherein the data is communicated over the data link using USB protocol.

18. The method of claim 16, further comprising the first host computer using a resource of the second host computer over the network by logical direct access.

19. The system of claim 18, wherein the resource comprises a peripheral device.

20. The system of claim 19, wherein the resource comprises a host resource.

* * * * *

UNITED STATES PATENT AND TRADEMARK OFFICE
CERTIFICATE OF CORRECTION

PATENT NO. : 10,133,695 B2
APPLICATION NO. : 14/917402
DATED : November 20, 2018
INVENTOR(S) : Christopher Whittington and Renato Condotta Page 1 of 1

It is certified that error appears in the above-identified patent and that said Letters Patent is hereby corrected as shown below:

In the Claims

Claim 18, Column 36, Line 51: "the network" should be replaced with --a network between the first host computer and the second host computer--

Claim 19, Column 36, Line 52: "The system" should be replaced with --The method--

Claim 20, Column 36, Line 54: "The system" should be replaced with --The method--

Signed and Sealed this
Twentieth Day of August, 2019

Andrei Iancu
*Director of the United States Patent and Trademark Office*